US008837511B2

(12) United States Patent
Ravindran et al.

(10) Patent No.: US 8,837,511 B2
(45) Date of Patent: Sep. 16, 2014

(54) SEAMLESS MOBILITY SCHEMES IN NAMES-DATA NETWORKING USING MULTI-PATH ROUTING AND CONTENT CACHING

(75) Inventors: Ravishankar Ravindran, San Jose, CA (US); Sau Man Lo, Atlanta, GA (US); Guo Qiang Wang, Santa Clara, CA (US); Xinwen Zhang, San Jose, AZ (US)

(73) Assignee: Futurewei Technologies, Inc., Plano, TX (US)

( * ) Notice: Subject to any disclaimer, the term of this patent is extended or adjusted under 35 U.S.C. 154(b) by 126 days.

(21) Appl. No.: 13/530,372

(22) Filed: Jun. 22, 2012

(65) Prior Publication Data

US 2013/0039249 A1 Feb. 14, 2013

Related U.S. Application Data

(60) Provisional application No. 61/523,103, filed on Aug. 12, 2011.

(51) Int. Cl.
*H04J 3/26* (2006.01)
*H04L 29/08* (2006.01)
*H04W 76/00* (2009.01)
*H04W 4/18* (2009.01)
*H04W 36/00* (2009.01)

(52) U.S. Cl.
CPC ......... *H04W 76/002* (2013.01); *H04L 67/2842* (2013.01); *H04W 36/0055* (2013.01); *H04W 4/18* (2013.01)
USPC .......................................... 370/432; 370/331

(58) Field of Classification Search
None
See application file for complete search history.

(56) References Cited

U.S. PATENT DOCUMENTS

| 8,305,980 B1 * | 11/2012 | Nix | 370/329 |
| 2002/0082015 A1 * | 6/2002 | Wu | 455/436 |
| 2010/0056215 A1 * | 3/2010 | Gorokhov et al. | 455/561 |
| 2010/0248727 A1 * | 9/2010 | Karaoguz et al. | 455/442 |
| 2011/0274082 A1 * | 11/2011 | Calhoun et al. | 370/331 |
| 2011/0280214 A1 * | 11/2011 | Lee et al. | 370/331 |
| 2012/0028643 A1 * | 2/2012 | Falchuk et al. | 455/436 |
| 2012/0208512 A1 * | 8/2012 | Maharajh et al. | 455/414.1 |
| 2013/0016695 A1 * | 1/2013 | Ravindran et al. | 370/331 |
| 2013/0250769 A1 * | 9/2013 | Karaoguz et al. | 370/235 |

OTHER PUBLICATIONS

Gaddah, et al. "Extending Mobility to Publish/Subscribe Systems Using a Pro-active Caching Approach," Los Press Mobile Information Systems 6, Dec. 1, 2010, pp. 293-324.

(Continued)

*Primary Examiner* — Anh-Vu Ly
(74) *Attorney, Agent, or Firm* — Conley Rose, P.C.; Grant Rodolph; Brandt D. Howell

(57) ABSTRACT

A content-centric-network (CCN)/named-data networking (NDN) system to support seamless mobility for a mobile node (MN) comprising a first point of attachment (PoA) configured to indicate to the MN that attaches to the first PoA one or more neighbor PoAs and to multicast an interest for content from the MN to the neighbor PoAs in a CCN or NDN when the MN starts a handoff procedure, and a second PoA from the one or more neighbor PoAs of the first PoA configured to receive the multicast interest from the first PoA, forward the interest to the CCN or NDN, receive content data from the CCN or NDN, and forward the content data to the MN.

43 Claims, 17 Drawing Sheets

(56) References Cited

OTHER PUBLICATIONS

Lee, et al. "Proxy-assisted Content Sharing Using Content Centric Networking (CCN) for Resource-limited Mobile Consumer Devices," IEEE Transactions on Consumer Electronics. vol. 57, No. 2, May 1, 2011, pp. 477-483.

Ravishankar, et al. "Supporting Seamless Mobility in Named Data Networking," IEEE International Conference on Communications, Jun. 10-15, 2012, pp. 5854-5869.

Jacobson, et al. "Networking Named Content," CoNEXT '09 Proceedings of the 5th International Conference on Emerging Networking Experiments and Technologies, Palo Alto Research Center, XP-002608160, Oct. 13, 2009, 13 pages.

Siris, et al. "A Selective Neighbor Caching Approach for Supporting Mobility in Publish/Subscribe Networks," XP-002690920, Retrieved from: http://atlas.tk.informatik.tu-darmstadt.de/Publications/2011/TUD-CS-2011-2893. pdf#p.=69, Jun. 14, 2011, pp. 63-67.

Foreign Communication From a Counterpart Application, PCT Application PCT/CN2012/046507, International Search Report, dated Feb. 12, 2013, 4 pages.

Foreign Communication From a Counterpart Application, PCT Application PCT/CN2012/046507, Written Opinion dated Feb. 12, 2013, 9 pages.

"Motoblur," Motorola Mobility, Inc. USA, http://www.motorola.com/Consumers/US-EN/Consumer-Product-andServices/Motoblur, downloaded from the Internet Apr. 4, 2012, 2 pages.

"Motoblur—The Best of Blur Got Better," Motorola Mobility, Inc. USA, http://www.motorola.com/Consumers/US-EN/Consumer-Product-and-Services/Motoblur, downloaded from the Internet Apr. 4, 2012, 2 pages.

"Motoblur," Motoblur—Wikipedia, http://en.wikipedia.org/wiki/Motoblur, downloaded from the Internet Apr. 4, 2012, 2 pages.

"Part 11: Wireless LAN Medium Access Control (MAC) and Physical Layer (PHY) Specifications," IEEE Standard for Information Technology—Telecommunications and Information Exchange Between Systems—Local and Metropolitan Area Networks-Specific Requirements, IEEE Std 802.11-2007, Jun. 12, 2007, 1232 pages.

* cited by examiner

SEAMLESS MOBILITY SCHEMES IN NAMES-DATA NETWORKING USING MULTI-PATH ROUTING AND CONTENT CACHING

CROSS-REFERENCE TO RELATED APPLICATIONS

The present application claims the benefit of U.S. Provisional Patent Application No. 61/523,103 filed Aug. 12, 2011 by Ravishankar Ravindran, et al. and entitled "Seamless Mobility Schemes in Named-Data Networking," and is a continuatuion-in-part of U.S. patent application Ser. No. 13/442,549 filed Apr. 9, 2012 by Ravishankar Ravindran, et al. and entitled "Method and Apparatus for Seamless Mobility Techniques in Content-Centric Network," which are both incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, also referred to as an Information-Centric Network (ICN), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the CON, content delivery including publishing, requesting, and managing (e.g., modification, deletion, etc.) may be based on content name and not content location. One aspect of the CON that may be different from traditional Internet Protocol (IP) networks is the ability of the CON to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, the disclosure includes a content-centric-network (CCN)/named-data networking (NDN) system to support seamless mobility for a mobile node (MN) comprising a first point of attachment (PoA) configured to indicate to the MN that attaches to the first PoA one or more neighbor PoAs and to multicast an interest for content from the MN to the neighbor PoAs in a CCN or NDN when the MN starts a handoff procedure, and a second PoA from the one or more neighbor PoAs of the first PoA configured to receive the multicast interest from the first PoA, forward the interest to the CCN or NDN, receive content data from the CCN or NDN, and forward the content data to the MN.

In another embodiment, the disclosure includes a CCN or NDN system to support seamless mobility for a MN comprising a first PoA configured to indicate to the MN that attaches to the first PoA one or more neighbor PoAs and to multicast an announcement for content from the MN to the neighbor PoAs in a CCN or NDN to support seamless mobility for the MN when the MN starts a handoff procedure, and a second PoA from the one or more neighbor PoAs of the first PoA configured to receive the multicast announcement from the first PoA, forward the announcement to the CCN or NDN, receive interest for content from the CCN or NDN, and forward the interest to the MN.

In another embodiment, the disclosure includes a network component that supports seamless mobility for a MN for a CCN or NDN comprising a proxy agent (PA) that runs on the network component and is configured to communicate with a mobility agent (MA) at the MN that is anchored to the network component to indicate to the MN information about one or more neighbor peers, to multicast an interest from the MN to the neighbor peers and a CCN or NDN when the MN is a content requester, and to multicast an announcement from the MN to the neighbor peers and the CCN or NDN when the MN is a content publisher.

In another embodiment, the disclosure includes a network component that supports seamless mobility for a MN for a CCN or NDN comprising a receiver configured to receive from a neighbor peer an interest or announcement for content that was sent from the MN attached to the neighbor peer before the MN moves to the network component, and a transmitter configured to send the interest or announcement to a CCN or NDN before the MN attaches to the network component.

In another embodiment, the disclosure includes a method implemented by a network component of a CCN or NDN for providing seamless mobility to a MN, comprising receiving using a receiver from the MN attached to the network component a request about a plurality of neighbor peers for the network component, receiving an indication to enable seamless mobility for the MN, receiving an interest or announcement for content from the MN, receiving one or more selected neighbor peers from the MN, and multicasting, using a transmitter, the interest or announcement to a CCN or NDN and the selected neighbor peers before the MN moves and attaches to one of the selected neighbor peers.

In yet another embodiment, the disclosure includes a method implemented by a network component of a CCN or NDN for providing seamless mobility to a MN, comprising receiving, using a receiver, an interest or announcement for content that is sent from the MN via a neighbor peer attached to the MN, forwarding the interest or announcement to a CCN or NDN before the MN moves from the neighbor peer and attaches to the network component, receiving content data or an interest for content from the CCN or NDN after forwarding the interest or announcement to the CCN or NDN, and forwarding the content data or the interest for content from the CCN or NDN to the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken

DETAILED DESCRIPTION

Figure 1A:
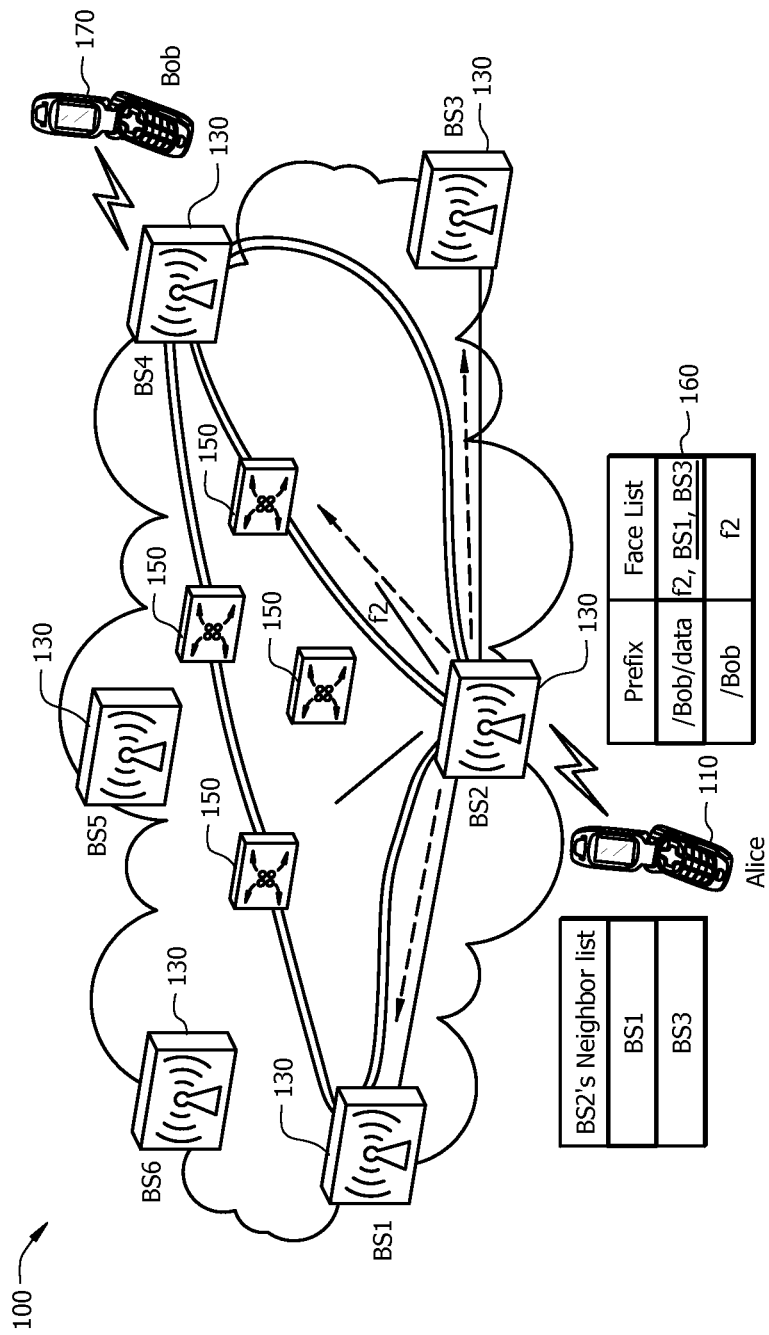
FIGS. 1A and 1B are schematic diagrams for a seamless mobility scheme according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Future forecasts for Internet Usage expect a substantial increase in user demand and traffic. However, the Internet was designed based on a host-to-host model and not for content delivery, which may require support for one-to-many and many-to-many delivery. Typically, a router in an IP network may have a forwarding table which stores the mapping between an address or prefix and a next-hop. Further, an Internet Protocol (IP) network may have limited support for mobility. For example, a Transmission Control Protocol (TCP) session may timeout when a device is mobile and undergoes a handoff.

In CON or ICN architectures, such as CCN/NDN, the forwarding table may be divided into a Pending Interest Table (PIT) and a Forwarding Information Base (FIB). The PIT may indicate where the content requesters are, and the FIB may indicate where the interests are to be forwarded. The PIT may store a mapping between the names (prefixes) of the interests (requests) and the arrival faces (interfaces) of the interests. A content may be requested by interests from different faces. When the requested content packet arrives, the packet may be forwarded to the requesting faces in the PIT.

The NDN may address these issues by routing on readable names and prefixes. A NDN router has a PIT, a FIB, and a Content Store (CS) for caching content. A NDN-enabled device may search for the closest copy of a content (content object) by sending interest packets with the content name to the network. Contents (content objects) may be located in any host (e.g., content router) and may be cached in CSs of the NDN routers. This feature may allow users to retrieve the same content without introducing extra traffic on the network. If a user has retrieved the content, the content may be cached in one or more local content routers, such as on a sub-network (subnet) of the user, and may be retrieved from the local routers for subsequent users.

Each entry in the PIT and FIB may comprise the name (or prefix) of the content and a face list. A face may be a physical interface, e.g., to a next-hop. The NDN may allow a list of faces to be associated with a content or prefix. As a result, multicast trees may be built with more ease with this feature. The PIT may store the requesters' interests, which may be forwarded based on the FIBs. The face list of a PIT entry may reflect how the content is to be sent back to the requesters. When multiple requesters express interests to a content, multiple faces may be added to the face list on a NDN router.

The mobility issue in the NDN may be addressed in terms of content requesters (users) and content publishers (providers). The mobility issues is addressed to ensure seamless experience to the end user during content requester or publisher mobility, also referred to herein as seamless mobility, such as ensuring minimum disruption to user applications as the user moves within the network to meet quality of experience (QoE) for the user. Typically, seamless mobility for the content requesters (e.g., mobile nodes or devices) may be achieved by re-expressing interests. A PoA may be a network node that interconnects with the MN at the NDN protocol layer (at the Open Systems Interconnection (OSI) model Layer Three (L3)). The PoA may be a Base Station (BS), such in cellular networks or the Institute of Electrical and Electronics Engineers (IEEE) standard 802.11 networks. Alternatively, the PoA may be an access or edge gateway of the network that may be coupled to one or more BSs. When a MN re-expresses the interest at the new PoA, the network may search for the closest copy of the content to the new PoA. However, the network may not have the knowledge of where the closest copy of the content is cached, and thus the re-expressed interest packets may be routed to the origin content host (content provider) to retrieve the content. For example, the origin content host may be a content server at the network or a data center coupled to the network. Alternatively, the origin content host may be a device (e.g., mobile node) coupled to the network and in communications with the requesting MN. The re-expressing of interests may introduce latency to the delivery of content, which may violate latency requirements of real-time applications, such as voice calling or video streaming.

Seamless mobility for the content publishers may be another issue that involves updating the FIB of the NDN routers on the movement of the content publisher. In some cases, the content may only be obtained from a MN, i.e., the content publisher, and for privacy reasons the content may not be cached in the network. Typically, in cases where the network keeps track of the MN's movement, the content publisher may send out announcements to the NDN routers to update the routers' FIBs about its recent location. The announcements may be notifications to the network about where the content resides. However, the FIB may only store the content prefixes, instead of each individual content name. When a content publisher moves from one to another PoA, the routing protocol may update the routers in the network to reflect the new changes.

Disclosed herein are systems, methods, and schemes for providing improved support for seamless mobility for content consumers (users) and publishers in the NDN/CCN. The seamless mobility may be enabled at the NDN protocol layer by forwarding interests or announcements to one or more potential neighbor PoAs (e.g., BSs or gateways) before the MN moves. The seamless mobility may be achieved by the simultaneous multicast of information to multiple PoAs. To handle content requests, the PoA attached to the MN before the move may forward the interests or announcements to the PoA's neighbor PoAs for the MN. The neighbor PoAs may be configured to forward these interests or announcements as in the case the MN was attached to neighbor PoAs. Interests forwarded from content requesters (or users) builds reverse content delivery paths to the potential PoAs and may be represented by PIT entries in the routers. Similarly, announcements forwarded from content publishers may build the content interest routing paths to the potential PoAs and may be represented by FIB entries. As a result, the MN may retrieve content or deliver content after the move, since the entries may have been already added before the move.

The systems and methods may comprise using the multi-path routing feature and the content caching properties of the NDN to create (logical) multicast trees to facilitate seamless mobility. A multicast tree of the content to the PoAs (BSs or gateways) of the MN may be built based on the mobility conditions. After the MN moves to a new PoA, the MN may start sending out interests/announcements without further setup, since the multicast tree may have been built before the movement. Such schemes may reduce the latency for re-expressing interests/announcements to the routing paths between the requesters and publishers.

The systems and methods may correspond to two modes of operation. In a first mode, a BS attached to a MN may be NDN enabled (interconnects with the MN at the NDN protocol layer). In a second mode, a Layer three (L3) NDN protocol layer may be enabled in a gateway that serves one or more multiple BSs, which may be OSI Layer Two (L2) entities. To assist mobility in the systems and methods, the MN may request the BS or gateway to which the MN attaches to publish the MN's information to one or more other BSs or gateways, e.g., based on the MN's mobility conditions.

The faces on the NDN routers may comprise physical interfaces and applications, and may also be mapped to virtual interfaces, tunnels, and agents. Further, each PoA (BS or gateway) may have a list of neighbor peers. This may facilitate L2 handoff procedure for the MN, which may be implemented when the MN moves from one to another PoA. The BSs or gateways may have a list of neighbor BSs or gateways to predict which BSs or gateways the MNs may attach to after the handoff. This neighbor list may be compiled by the BS or gateway and provided to the MN.

Typically, the MN may choose a BS for the handoff based on measured signal strength. This scheme may feasible in the Long Term Evolution (LTE) architecture and current gateway topologies, where interests and announcements may be forwarded from a BS to neighbor BSs through direct logical connections. In the NDN/CCN architecture, gateways may connect multiple BSs with the core of the network. However, inter-BS connections may not be available. In some of the systems and schemes herein, the gateways, which may be NDN-enabled, may forward the interests and announcements to the neighbor gateways. As such, when a MN re-attaches to another BS, the MN may re-express the interest to the gateway of the BS to retrieve the cached content, which may be closer than to the content origin in the network.

Typically, only the faces on which the content announcements arrived may be added to the face list in the FIB. Thus, a NDN router may only forward the interest packets to the faces learned from the announcements. In the systems and schemes herein, to support seamless mobility for mobile nodes, a BS may add to the face lists of the FIB entries any faces associated with the neighbor BSs. Additionally, more specific prefixes may be added to the FIBs. The FIBs may be constructed using optimization criteria to reach the content producers. The FIBs may comprise entries of prefixes instead of content names.

A change to a FIB entry for a MN that comprises a prefix may affect the routing of all the interests from other MNs to different contents associated with the same prefix, which may not be desirable. To resolve this issue, more specific prefix entries may be used with different face lists based on the location of the contents. The specific prefix entries in the FIBs may allow resolving the interest requests from different MNs to which the entries were created. However, this may require adding more routing entries to the FIB. Instead, to resolve interests for the same content from different MNs and use prefixes in the FIBs, the FIB entries corresponding to the same content (and prefix) may be associated with more metadata information, such as a client identifier (ID), which may be matched to the proper next-hop.

To support mobility support, additional interests may be expressed to the neighbor BSs. When the MN sends interests to a BS, the BS may forward the interests to the faces in the face list associated with the interests' prefix, and also to the neighboring BSs to which the MN may potentially handoff to. A control plane of the network may support interactions between the BS and the MN, where the MN may notify the BS of the prefixes (corresponding to applications) that require seamless mobility support. This may be enabled through some signaling between a MA at the MN, which may identify the applications that require seamless mobility support, and a PA at the BS, which may configure accordingly the forwarding plane to handle multicasting of interests from the MN. The MA and PA may be software modules that run on the MN and BS, respectively.

Multicasting interests along multiple interfaces may allow creating the PIT entry for the corresponding content at a new PoA to which the MN moves by the time the handoff is completed. Hence, by the time the MN moves to the new PoA, the new PoA may either be waiting for the content publisher to send back the content or may have already received the requested content and cached the content in the local CS. When the MN registers itself with the new PoA, the MN may re-express the interest to the new PoA to retrieve the cached content. Similar seamless mobility schemes may be used to handle interests from a content requester at neighbor PoAs (BSs or gateways) and announcements from a content publisher at neighbor PoAs, as described in details below.

Figure 1B:
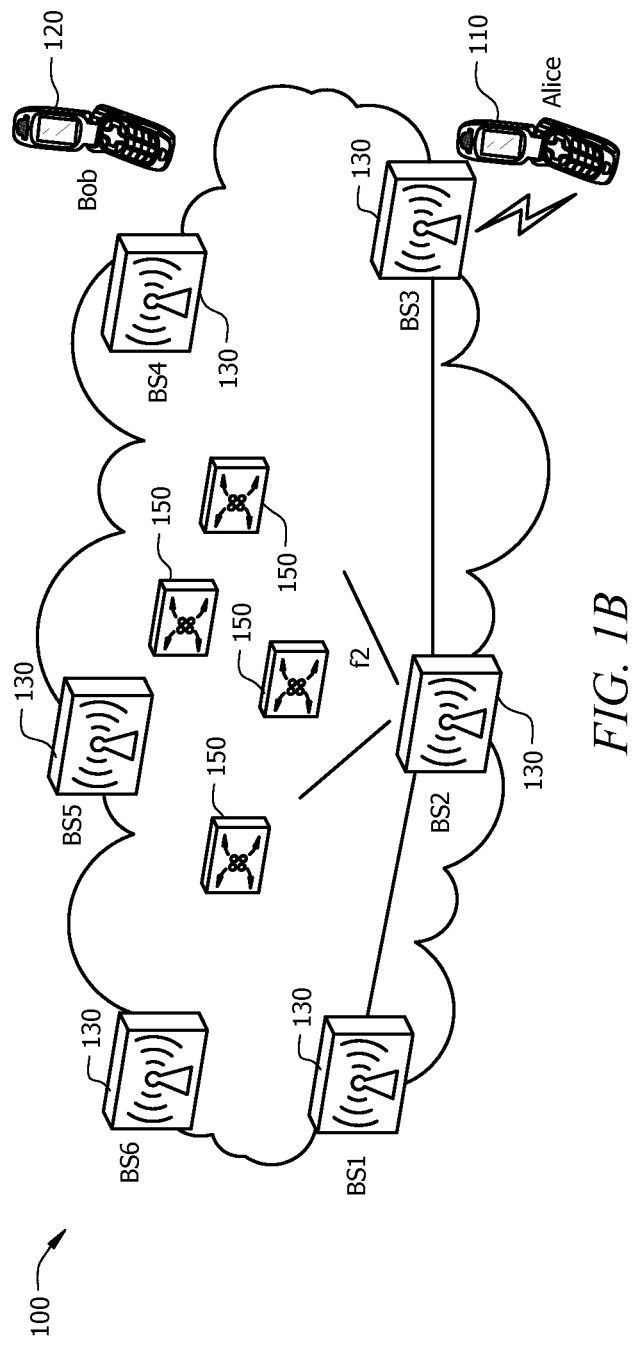

FIGS. 1A and 1B illustrate an embodiment of a seamless mobility scheme 100 for a mobile content requester in a CCN/NDN. The CCN/NDN may comprise a MN 110, a second MN 120, a plurality of base stations (BSs) 130, and a plurality of content routers 150. The CCN/NDN may comprise any number of such components. The MN 110 may be an end user device that has mobile access capability (via wireless communications). The second MN 120 may be another static or mobile device that may be in a communications session with the MN 110. For example, the MN 110 and second MN 120 may be mobile devices, such as a smartphones, that are involved in a conversation session (e.g., for Voice/Video or Two/Multi-Party Conferencing) with each other. In another example, the second MN 120 may be a device that is serving some content to the MN 110. The MN 110 (and the second MN 120) may attach to one of the BSs 130 (labeled BS 1, BS2, etc.), such as cellular network BSs. Alternatively, the BSs 130 may be attachment points of IEEE standard 802.11 networks. The BSs 130 may be coupled to one or more content routers 150 and may serve as PoAs, i.e., anchoring points, for the MN 110 (and the second MN 120). The PoAs are NDN enabled and communicate with the MNs at the NDN layer. The operations of the MNs and the BSs in the scheme 100 may be implemented by MAs (at the MNs) and PAs (at the BSs).

In FIG. 1A, a content requester, the MN 110, may attach to a first BS 130. The MN 110 for a user (Alice) may attach (via a wireless link) to one of the BSs 130, BS2, to establish communications with the network. BS2 may hence serve as a PoA for the MN 110. BS2 may have a list of neighbor BSs 130, BS 1 and BS3. The MN 110 may signal to the PA on the PoA (BS2) about it being in a state of handoff. The PA on the PoA (BS2) may then reply with a list of neighbor PoAs (BSs). The MN 110 may then send a request to enable seamless mobility to PA. The request may include the set of interest prefixes (for applications), which may require seamless mobile support and a subset of neighbor PoAs (BSs) to which the MN may possibly move. An interest may include the name of the content as well. Upon receiving the prefixes, the PA may add specific entries comprising more granular prefixes to its FIB, FIB 160. The face list of this specific entry may include the faces of the prefixes and the neighbor PoAs (BSs) that the MN 110 has requested. The decision on the potential PoA (BS) to which the MN 110 may move to may also be made by the current PoA (BS 130), e.g., based on predictive schemes that may be used. A more specific entry for the MN 110 in the FIB 160 may have a more specific prefix indicating the content source and name (/Bob/data) and the associated face list in the entry may include the next-hop (f2) and the neighbor PoAs (BS 1 and BS3). Another method to route to MN may be to use a centralized controller that maps the MN to a PoA, e.g., as described in U.S. patent application Ser. No. [4194-45401 (83215726US02)] filed Apr.? [ ], 2012 by Ravishankar Ravindran, et al. and entitled "Method and Apparatus for Seamless Mobility Techniques in Content-Centric Network," which is incorporated herein by reference as if reproduced in its entirety. This may avoid the requirement for the content routing plane to be in sync with the MNs in the network, and avoid churn in terms of routing convergence.

The MN 110 may then anycast the interest to the content producer Bob, which may correspond to the second MN 120. For instance, the application may be a host-to-host session (e.g., conversation) between Alice with Bob. The interest may have seamless mobility support enabled, such as by marking this interests indicate support for seamless mobility. BS2 may forward the interest to all (or some of) the faces corresponding to the new FIB 160 entry, e.g., f2, BS 1, and BS2. When the second MN 120 (Bob) receives the interest, the second MN 120 may reply with a data response that may be multicast to BS2 and its neighbor BSs, to handle future movements of the MN 110. For instance, the MN 110 may move from BS2 to BS3 (in a handoff procedure). In FIG. 1B, when the MN 110 attaches to BS3, the content may have already been received and cached in BS3 or a PIT entry for receiving the content may have been created at BS3. After the MN 110 moves to BS3, the MN 110 may send out an interest to search for the source Bob, BS3 may hence return the cached content or add a face in the already created PIT entry.

Figure 2:
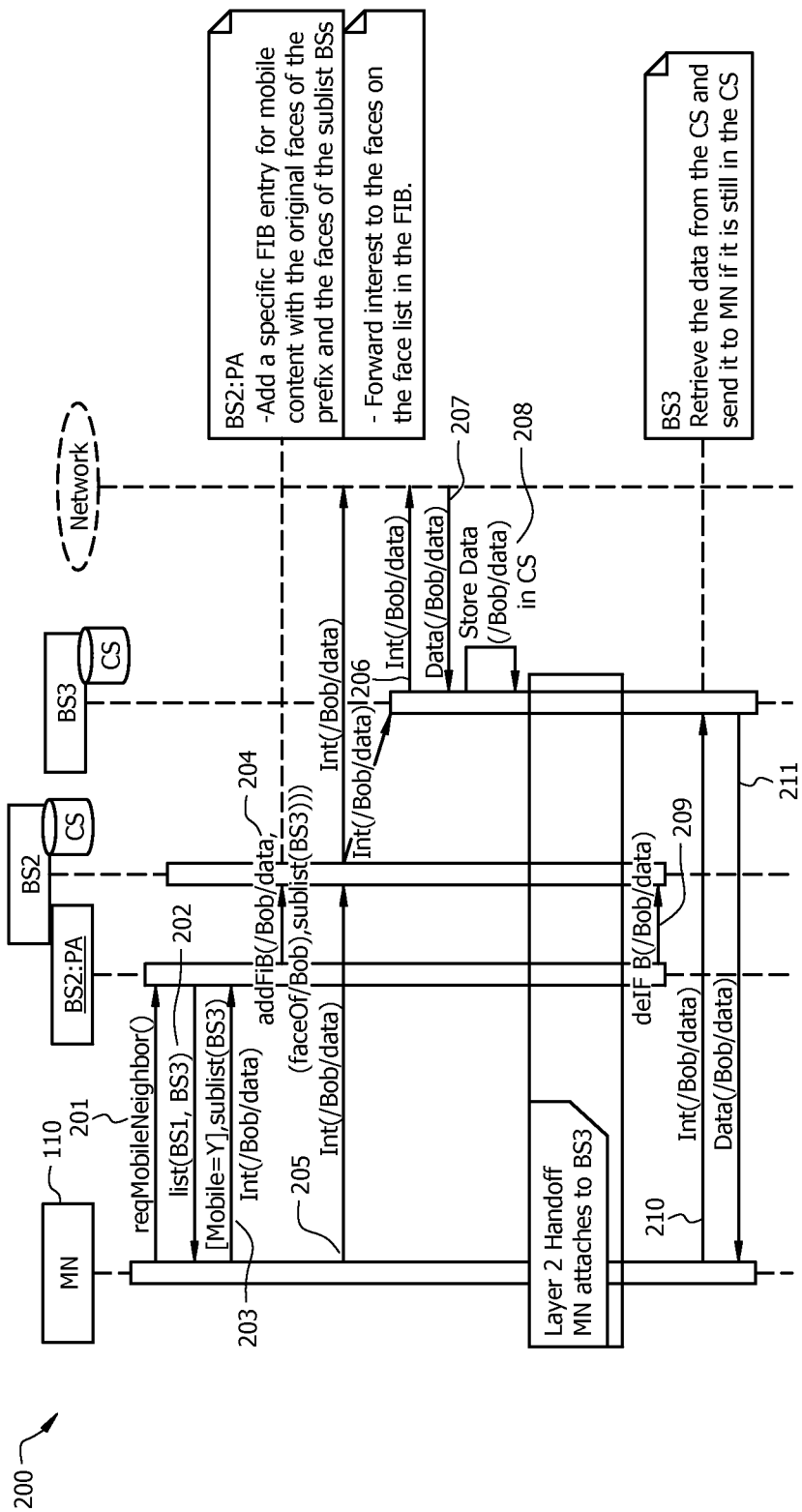
FIG. 2 is a protocol diagram of an embodiment of a seamless mobility method.

FIG. 2 illustrates an embodiment of a seamless mobility method 200 that may be implemented in the seamless mobility scheme 100. The method 200 comprises the message exchanges in the case when the content is returned to BS3 before the handoff procedure of MN 110 (from BS2 to BS3) is completed, i.e., before the MN's 110 move to BS3 is completed. The operations of the MNs and BSs in the method 200 may be implemented by MAs (at the MNs) and PAs (at the BSs). At step 201, when the MN 110 is entering the phase of handoff, the MN 110 may send a request to BS2 to obtain the neighbor BSs of BS2. At step 202, the PA of BS2 may return a list of the neighbor BSs. At step 203, the MN 110 may send (in a message) an interest for content with a specific prefix that indicates the content source or provider and the name of content/data. The message may also indicate that seamless mobility support is enabled and a subset from the neighbor BSs to which the MN 110 may move to. The subset of neighbor BSs may represent the potential BSs that the MN 110 is expected to move to from the current BS. At step 204, the PA of BS2 may add a FIB entry including the specific prefix from the MN 110, an associated face for the next-hop to the source, and the indicated subset of neighbor BSs.

At step 205, the MN 110 may send an interest for the content to BS2, which may be forwarded in turn from BS2 to the network via the faces associated with the prefix (indicated in the interest) in the FIB. Thus, the interest may reach the neighbor BS, BS3, indicated in the faces of the FIB entry. At step 206, BS3 may also forward the interest to the network. The interest may eventually reach the source (Bob), which may respond with the content/data. At step 207, the network may return the content/data to BS3. At step 208, BS3 may store or cache the data in its CS. During the data exchange, the MN 110 may have completed the handoff procedure and attached to BS3. At step 209, the PA may delete the FIB entry for the MN 110. At step 210, the MN 110 may send an interest for the content to BS3. At step 211, BS3 may return the cached content to MN 110.

Figure 3:
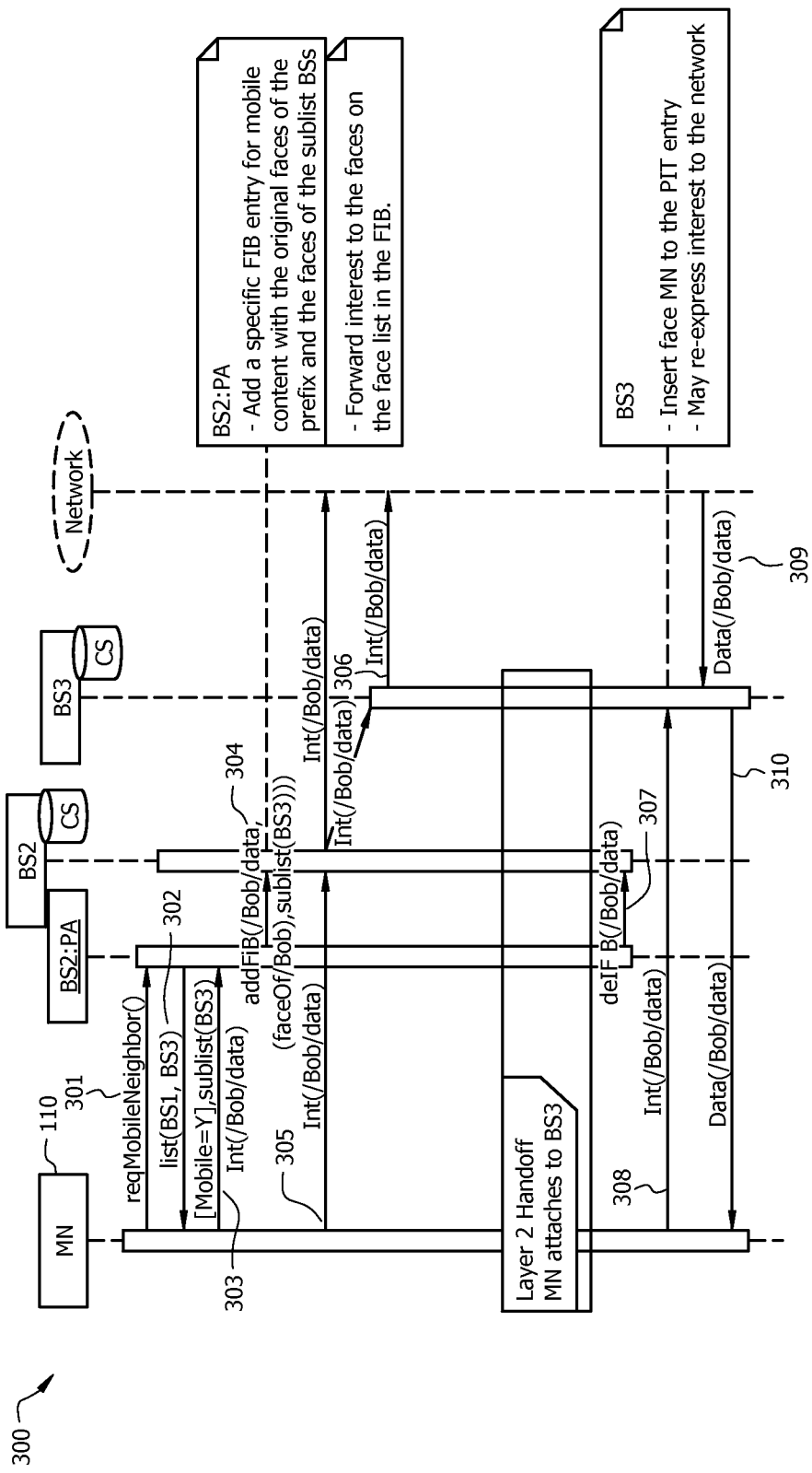
FIG. 3 is a protocol diagram of another embodiment of a seamless mobility method.

FIG. 3 illustrates another embodiment of a seamless mobility method 300 that may be implemented in the seamless mobility scheme 100. The method 300 comprises the message exchanges when the content is returned to BS3 after the handoff procedure of MN 110 (from BS2 to BS3) is completed, i.e., after the MN's 110 move to BS3 is completed. The operations of the MNs and the BSs in the method 300 may be implemented by MAs (at the MNs) and PAs (at the BSs). At step 301, when the MN 110 attaches to BS2, the MN 110 may send a request to BS2 to obtain the neighbor BSs of BS2. At step 302, the PA of BS2 may return a list of the neighbor BSs. At step 303, the MN 110 may send (in a message) an interest for content with a specific prefix that indicates the content source or provider and the name of content/data. The message may also indicate a subset from the neighbor BSs to which the MN 110 may move to. The subset of neighbor BSs may represent the potential BSs that the MN 110 is expected to move to from the current BS. At step 304, the PA of BS2 may add a FIB entry including the specific prefix from the MN 110, an associated face for the next-hop to the source, and the indicated subset of neighbor BSs.

At step 305, the MN 110 may send an interest for the content to BS2, which may be forwarded in turn from BS2 to the network via the faces associated with the prefix (indicated in the interest) in the FIB. Thus, the interest may reach the neighbor BS, BS3, indicated in the faces of the FIB entry. At step 306, BS3 may also forward the interest to the network. Subsequently, the MN 110 may complete a handoff procedure and attach to BS3. At step 307, the PA of BS2 may delete the FIB entry for the MN 110. At step 308, the MN 110 may send an interest for the content to BS3. BS3 may then insert in its PIT a face for the MN 110, and re-express the interest to the network. The interest may eventually reach the source (Bob), which may respond with the content/data. At step 309, the network may return the content data to BS3. At step 310, BS3 may return the content data to MN 110.

Figure 4A:
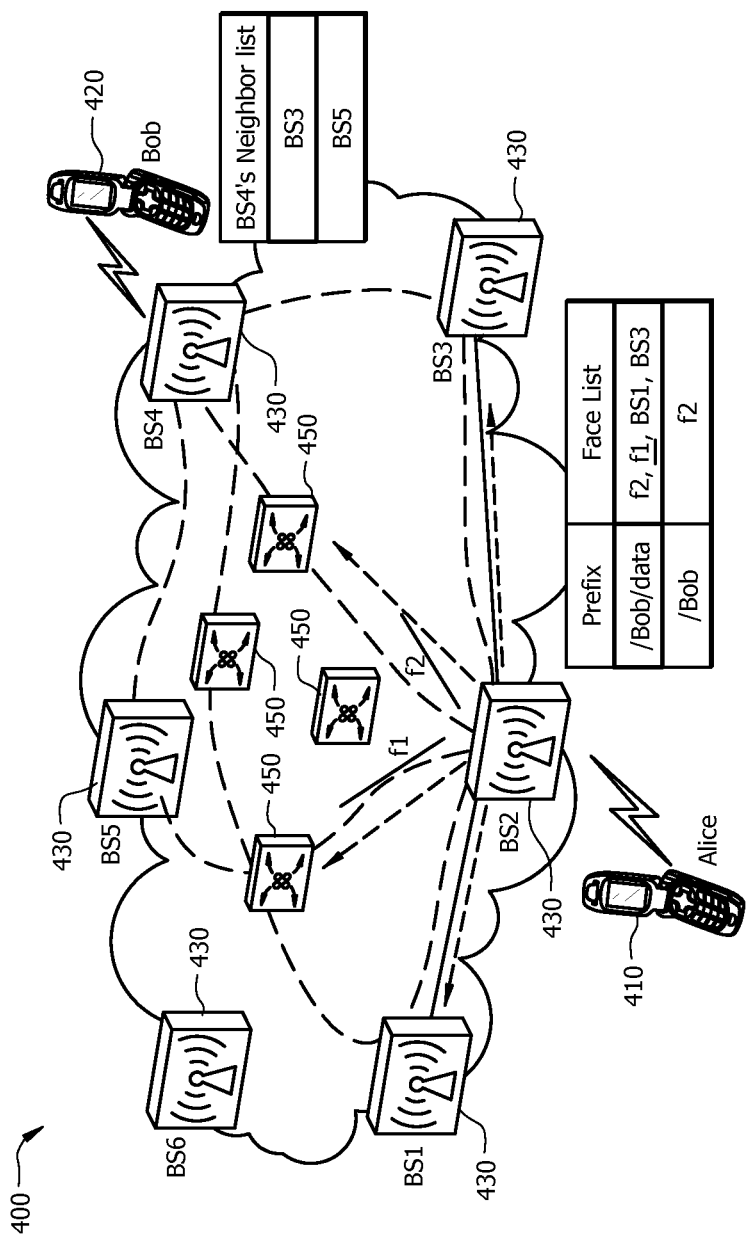
FIGS. 4A and 4B are schematic diagrams for another seamless mobility scheme according to an embodiment of the disclosure.
Figure 4B:
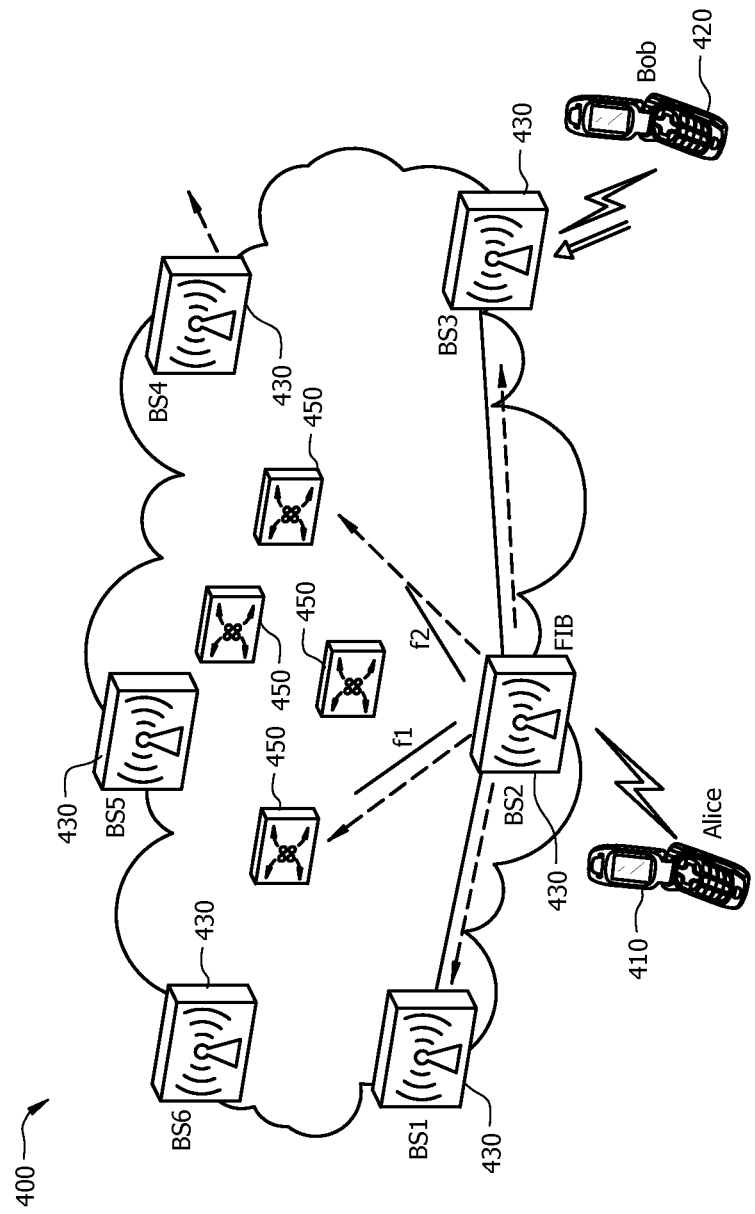

FIGS. 4A and 4B illustrate an embodiment of another seamless mobility scheme 400 for a mobile content publisher in a CCN/NDN. The CCN/NDN may comprise a MN 410, a second MN 420, a plurality of BSs 430 that may serve as PoAs for the MNs, and a plurality of content routers 450. The CCN/NDN may comprise any number of such components. The components may be configured similar to the corresponding components above. A control plane in the network may be enabled to support an announcement mechanism for the MNs to publish prefixes to the network. Through prefix announcements, the NDN routers may learn about the prefixes and the faces through which the content may be reachable, which may be reflected in the routers' FIBs. When a content publisher moves (from one to another BS), the publisher may notify the network that it has moved to another BS. Otherwise, the interests for the publisher may still be forwarded (from a requester) to the old BS (of the publisher). To reduce the latency of convergence, additional announcements of the mobile content may be forwarded (form the publisher) to the possible BSs before the publisher moves. The operations of the MNs and the BSs in the scheme 400 may be implemented by MAs (at the MNs) and PAs (at the BSs).

In FIG. 4A, a content publisher, the second MN 420, may attach to a first BS 430. The second MN 420 for a publisher (Bob) may attach (via a wireless link) to one of the BSs 430, BS4, to establish communications with the network. BS4 may hence serve as a PoA for the second MN 420. BS4 may have a list of neighbor BSs 430, BS3 and BS5. The second MN 420 may send an announcement for a mobile content to BS4. BS4 may then forward the announcement to its neighbor BSs 430 and the network. The neighbor BSs 430 may also forward the announcements to the network. Another BS 430, BS2, attached to a requester, the MN 410, may receive the announcement from one or more faces (next-hops) and add the faces to its FIB, FIB 460. When the requester MN 410 (for a user, Alice) send out an interest for the content of Bob to BS2, BS2 may in turn forward the interest to all the faces in its FIB that may be associated with the prefix in the interest. The faces (next-hops) may in turn forward the interest to the potential BSs 430 to which the second MN 420 may move to.

For instance, the second MN 420 may move from BS4 to BS3, which may serve as a new BS. In FIG. 4B, the second MN 420 may receive the interest before moving to BS3. In this case, after the move is completed, the second MN 420 may publish the content to BS3, which may forward the data (via the network and BS2) to the MN 410. Publishing the content corresponds to sending an announcement for the content, without sending the content data. The announcement may comprise a prefix for the content that may be used to populate a FIB in the network so that the interests from the requesters are correctly routed to the producer. Alternatively, the second MN 420 may move to BS3 before receiving the interest. In this case, after the move is completed, the second MN 420 may publish the content to BS3. BS3 may then re-express the outstanding interest received from the MN 410 to the second MN 420. The second MN 420 may then send back the data. Specifically, when BS3 receives the interest from the MN 410 before the second MN 420 publishes the content to BS3, BS3 may not find a FIB entry to route the interest for the second MN 420. Thus, BS3 may hold the interest and subsequently re-express the interest to the second MN 420 when an entry for the second MN 420 is created in its FIB. For instance, BS3 may hold the interest instead of dropping the interest if BS3 has some indication that the second MN 420 is moving into BS3's coverage area.

Figure 5:
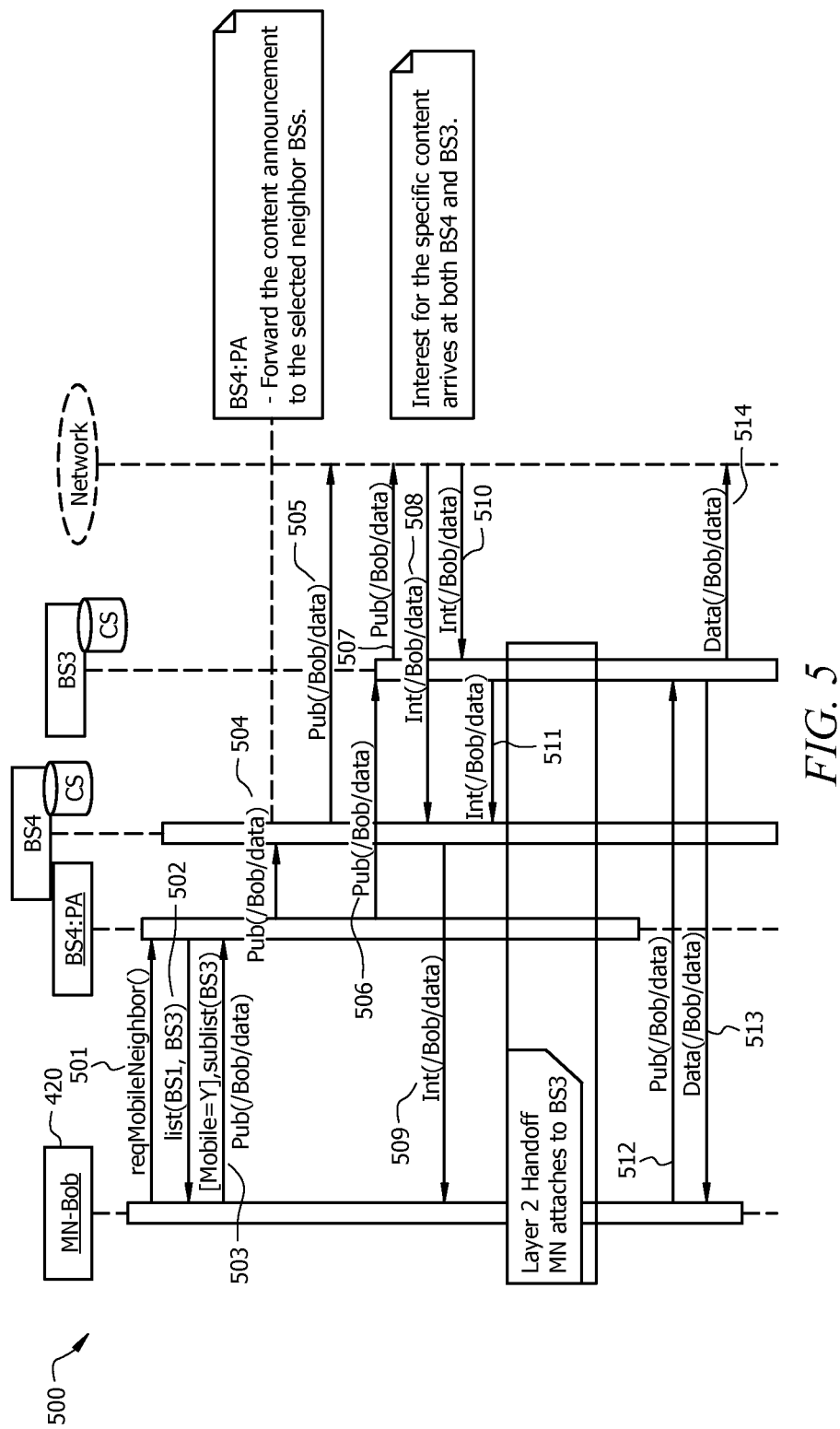
FIG. 5 is a protocol diagram of another embodiment of a seamless mobility method.

FIG. 5 illustrates an embodiment of a seamless mobility method 500 that may be implemented in the seamless mobility scheme 400. The method 500 comprises the message exchanges in the case when the second MN 420 receives the interest for content before the second MN 420 completes the move from BS4 to BS3. The operations of the MNs and the BSs in the method 500 may be implemented by MAs (at the MNs) and PAs (at the BSs). At step 501, when the second MN 420 attaches to BS4, the second MN 420 may send a request to BS4 to obtain the neighbor BSs of BS4. At step 502, the PA of BS4 may return a list of the neighbor BSs. At step 503, the second MN 420 may publish (in a message) content with a specific prefix into the content routing plane that indicates the content source or provider and the name of content/data to the PA of BS4. The message may also indicate that seamless mobility support is enabled and a subset from the neighbor BSs to which the second MN 420 may move to. The subset of neighbor BSs may represent the potential BSs that the second MN 420 is expected to move to from the current BS. The PA of BS4 may in turn publish the content indicated by the second MN 420 to the subset of neighbor BSs. At step 504, the PA may publish the content to BS4. At step 505, BS4 may publish the content to the network. At step 506, the PA of BS4 may publish the content to the neighbor BS, BS3. At step 507, BS3 may in turn further publish the content to the network.

At step 508, the network may send an interest for the content (from the MN 410) to BS4. At step 509, BS4 may in turn send the interest to the second MN 420. At step 510, the network may also send the interest to BS3. As such, the interest may arrive to both BS3 and BS4. At step 511, BS3 may in turn send the interest to BS4. Subsequently, the second MN 420 may complete a handoff procedure and attach to BS3. At step 512, the second MN 420 may publish the content to BS3. At step 513, the second MN 420 may send the requested content data to BS3. At step 514, BS3 may in turn send the data to the network, which may then forward the data to the requesting MN 410.

Figure 6:
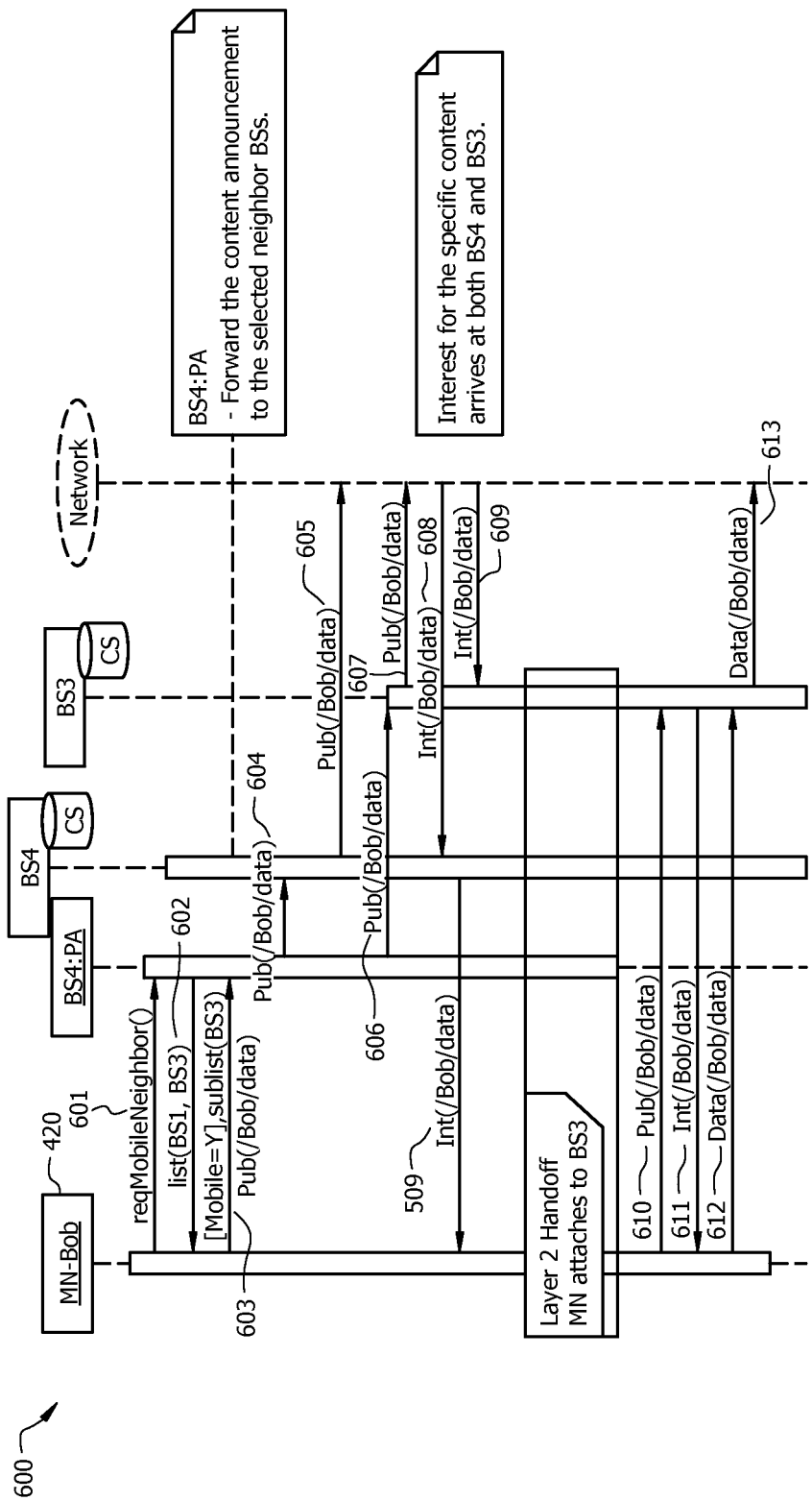
FIG. 6 is a protocol diagram of another embodiment of a seamless mobility method.

FIG. 6 illustrates an embodiment of a seamless mobility method 600 that may be implemented in the seamless mobility scheme 400. The method 600 comprises the message exchanges in the case when the second MN 420 receives the interest for content after the second MN 420 moves to BS3. The operations of the MNs and the BSs in the method 600 may be implemented by MAs (at the MNs) and PAs (at the BSs). At step 601, when the second MN 420 attaches to BS4, the second MN 420 may send a request to BS4 to obtain the neighbor BSs of BS4. At step 602, the PA of BS4 may return a list of the neighbor BSs. At step 603, the second MN 420 may publish (in a message) content with a specific prefix that indicates the content source or provider and the name of content/data to the PA of BS4. The message may also indicate that seamless mobility support is enabled and a subset from the neighbor BSs to which the second MN 420 may move to. The subset of neighbor BSs may represent the potential BSs that the second MN 420 is expected to move to from the current BS. The PA of BS4 may in turn publish the prefixes indicated by the second MN 420 to the subset of neighbor BSs. At step 604, the PA may publish the content to BS4. At step 605, BS4 may publish the content to the network. At step 606, the PA of BS4 may publish the content to the neighbor BS, BS3. At step 607, BS3 may in turn further publish the content to the network.

At step 608, the network may send an interest for the content (from the MN 410) to BS4. At step 609, the network may also send the interest to BS3. As such, the interest may arrive to both BS3 and BS4. Subsequently, the second MN 420 may complete a handoff procedure and attach to BS3. At step 610, the second MN 420 may publish the content to BS3. At step 611, BS3 may send the received interest to the second MN 420. At step 612, the second MN 420 may send the requested content data to BS3. At step 613, BS3 may in turn send the data to the network, which may then forward the data to the requesting MN 410.

The schemes above may require establishing faces that directly or logically connect to neighbor BSs. These faces may be set up through tunneling. For instance, in fourth generation (4G) LTE, an evolved Universal Mobile Telecommunications System (UMTS) Terrestrial Radio Access Network (E-UTRAN) Node B (e-NodeB) may have interfaces, which may be logical faces, to other BSs. As such, the schemes above may be used for such architecture.

However, in a traditional gateway topology, the BSs may be connected to gateways using L2 connectivity. The gateways may be connected through the core network and may be NDN enabled. A handoff between BSs under the same gateway may be managed by known L2 handoff schemes. To support a handoff between BSs under different gateways, similar seamless mobility schemes as described above may be used. Specifically, each gateway may keep a list of neighbor gateways and forward interests/announcements to the neighbor gateways, e.g., when a MN moves to a new BS under a new gateway. Thus, after the MN moves to a new BS under a new gateway, the new gateway may have already cached the content or the gateway's PIT/FIB may have already been updated for the MN.

Figure 7A:
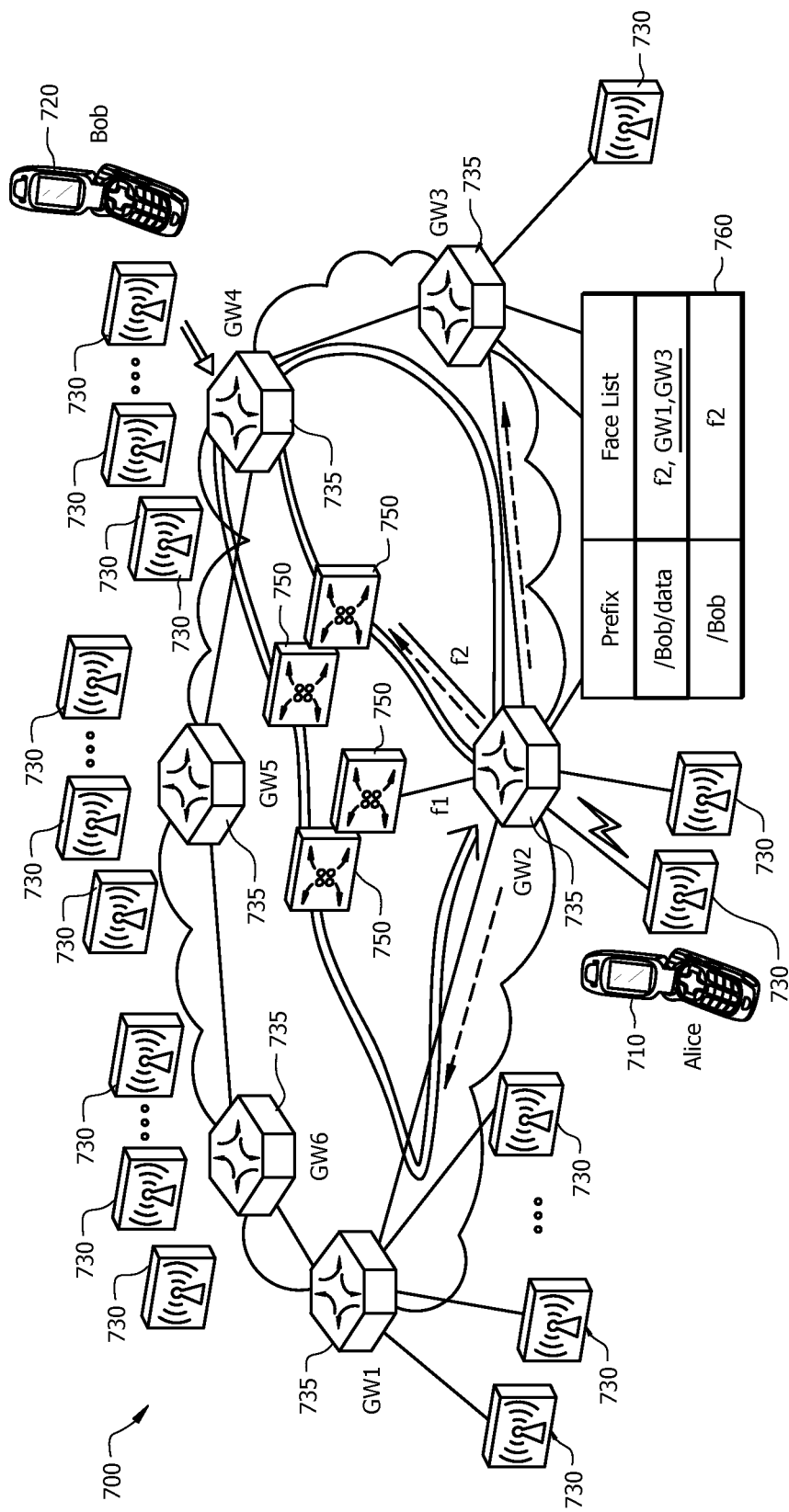
FIGS. 7A and 7B are schematic diagrams for another seamless mobility scheme according to an embodiment of the disclosure.
Figure 7B:
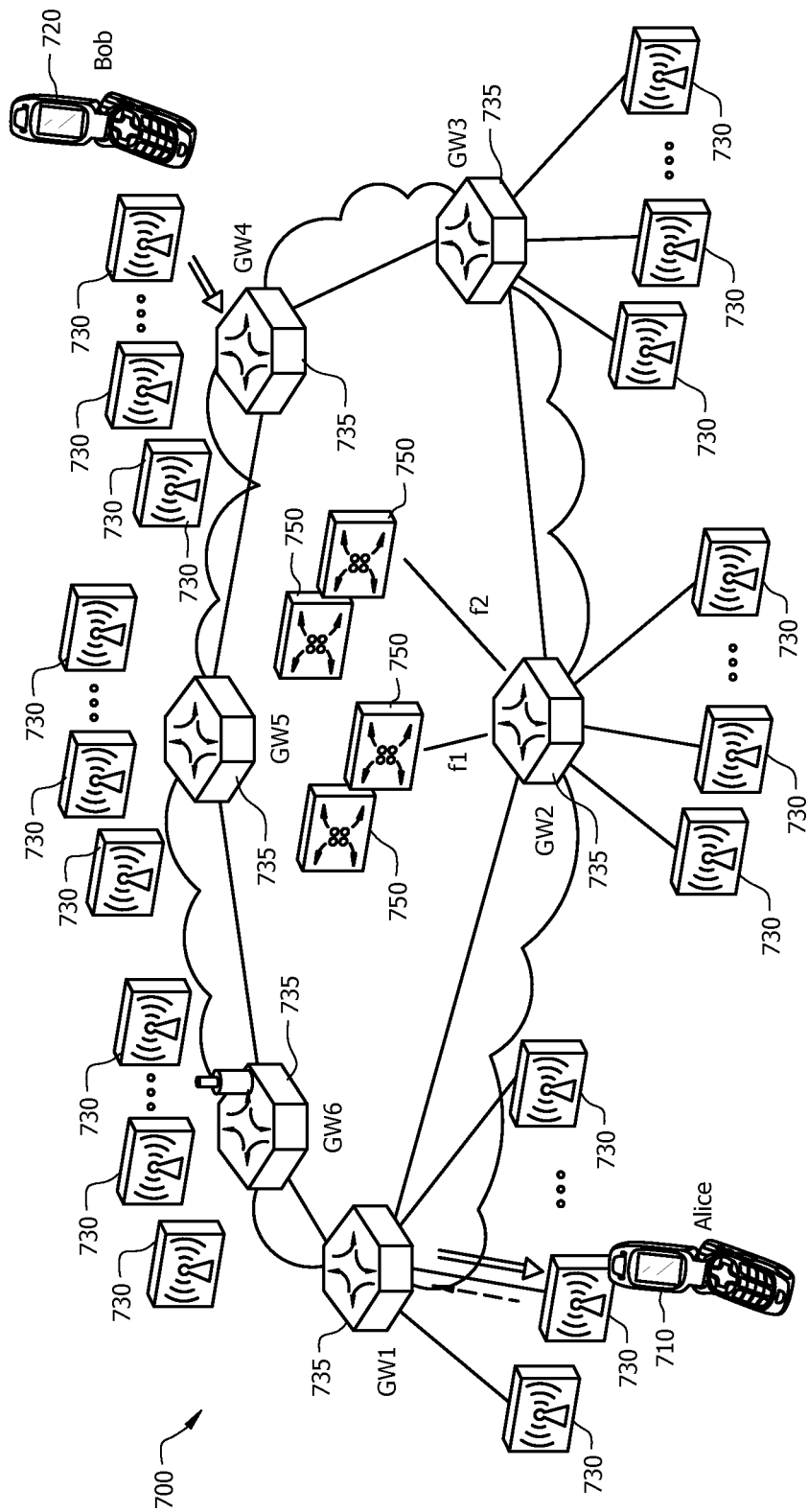

FIGS. 7A and 7B illustrate another embodiment of a seamless mobility scheme 700 for a mobile content requester in a CCN/NDN. The CCN/NDN may comprise a MN 710, a second MN 720, a plurality of BSs 730 coupled to a plurality of corresponding gateways 735, and a plurality of content routers 750. The CCN/NDN may comprise any number of such components. The BSs 730 may forward data between the MN 710 (and the second MN 720) and the network at the L2 layer, and the gateways 735 may transfer the data between the BSs 730 and the network at the L3 layer (the NDN protocol layer, also referred to as the NDN forwarding plane). Each gateway 735 may be coupled to one or more BSs 730 and may manage the state and connectivity of the corresponding BSs 730.

In FIG. 7A, a content requester, the MN 710 for a user (Alice), may attach to a first BS 730 under a first gateway 735, GW2, to establish communications with the network. GW2 may have a list of neighbor gateways 735, GW1 and GW3. GW2 may add the neighbor gateways to a face list for the MN 710 in its FIB, FIB 760. GW2 may add an entry in the FIB 760 for the MN 710 upon receiving a request for content from the MN 710. The entry may comprise the faces of the indicated prefix and the neighbor gateways that the MN 710 has requested. The prefix may be a specific prefix as described above, and the face list may include the face for the next-hop (f2) and the faces corresponding to neighbor gateways, GW1 and GW3. The MN 710 may send an interest to search for content from the second MN 720 for a provider (Bob), with mobile support enabled in the request. GW2 may forward the interest to all the faces on the FIB entry of the prefix in the interest (/Bob/data). Upon receiving the interest via the network, the second MN 720 may reply to the interest with a response, which may build a multicast tree to GW2 and its neighbor gateways.

In FIG. 7B, the MN 710 may move to a new BS 730 under a new gateway 735, GW1, and re-express the interest. At this point, the content may have already been received and cached at GW1, or the interest for that content may have been already added to an entry in GW1's PIT. When the requested data arrives to GW1, GW1 may forward the data to the MN 710 via the new BS 730.

Figure 8:
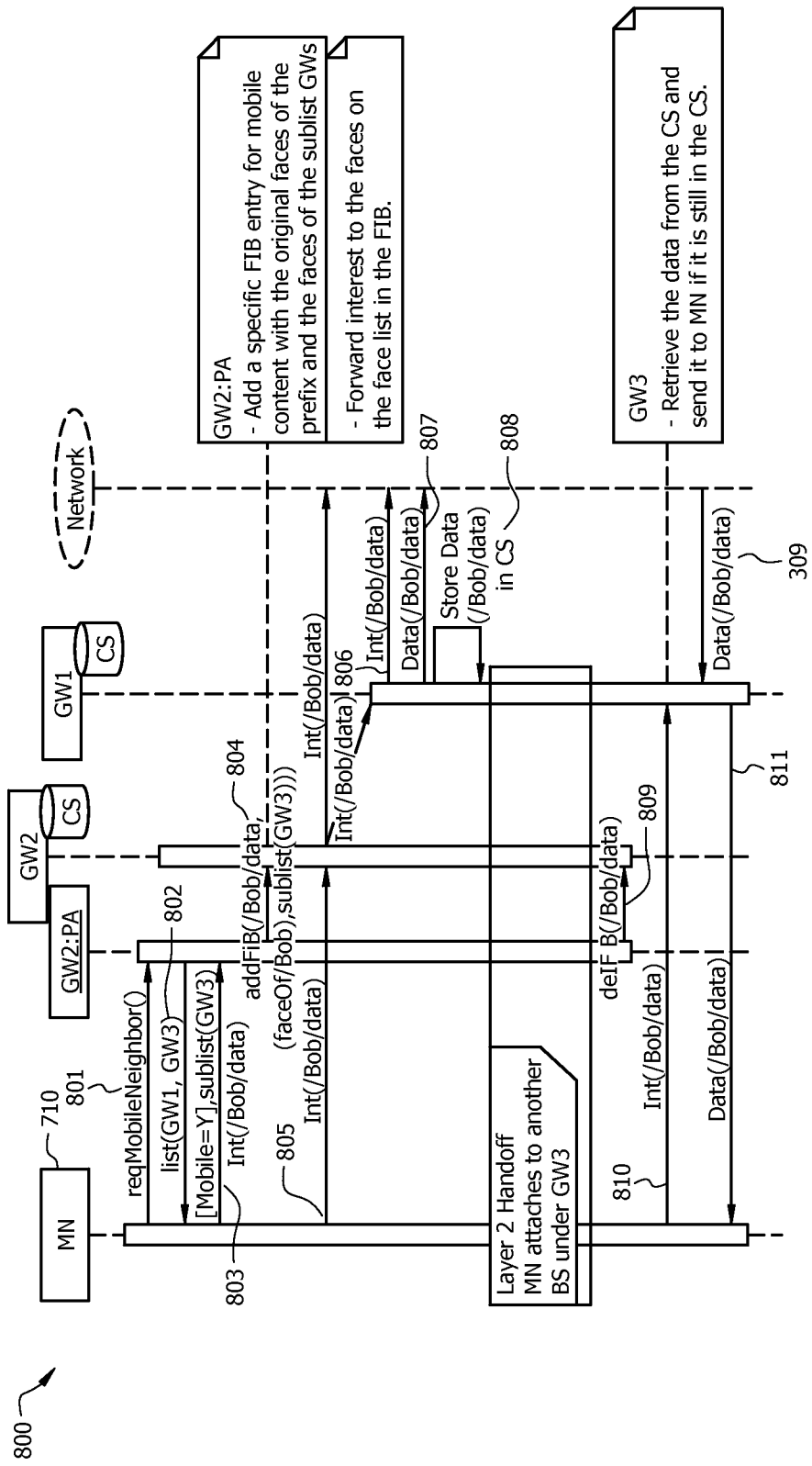
FIG. 8 is a protocol diagram of another embodiment of a seamless mobility method.

FIG. 8 illustrates an embodiment of a seamless mobility method 800 that may be implemented in the seamless mobility scheme 700. The method 800 comprises the message exchanges in the case when the content is returned to GW1 before the handoff procedure of MN 710 (from GW2 to GW1) is completed, i.e., before the MN's 710 move to GW1 is completed. The operations of the MNs and gateways in the method 800 may be implemented by MAs (at the MNs) and PAs (at the gateways). At step 801, when the MN 710 attaches to GW2, the MN 710 may send a request to GW2 to obtain the neighbor gateways of GW2. At step 802, the PA of GW2 may return a list of the neighbor gateways. At step 803, the MN 710 may send (in a message) an interest for content with a specific prefix that indicates the content source or provider and the name of content/data. The message may also indicate that seamless mobility support is enabled and a subset from the neighbor gateways to which the MN 710 may move to. The subset of neighbor gateways may represent the potential gateways that the MN 710 is expected to move to from the current gateway. At step 804, the PA may add a FIB entry including the specific prefix from the MN 710, an associated face for the next-hop to the source, and the indicated subset of neighbor gateways.

At step 805, the MN 710 may send an interest for the content to GW2, which may be forwarded in turn from GW2 to the network via the faces associated with the prefix (indicated in the interest) in the FIB. Thus, the interest may reach the neighbor gateway, GW1, indicated in the faces of the FIB entry. At step 806, GW1 may also forward the interest to the network. The interest may eventually reach the source (Bob), which may respond with the content/data. At step 807, the network may return the content/data to GW1. At step 808, GW1 may store or cache the data in its CS. During the data exchange, the MN 710 may have completed the handoff procedure and attached to a new BS under GW1. At step 809, the PA of GW2 may delete the FIB entry for the MN 710. At step 810, the MN 710 may send an interest for the content to GW1. At step 811, the network may return the content data to the GW1. At step 812, GW1 may return the content data to the MN 710.

Figure 9:
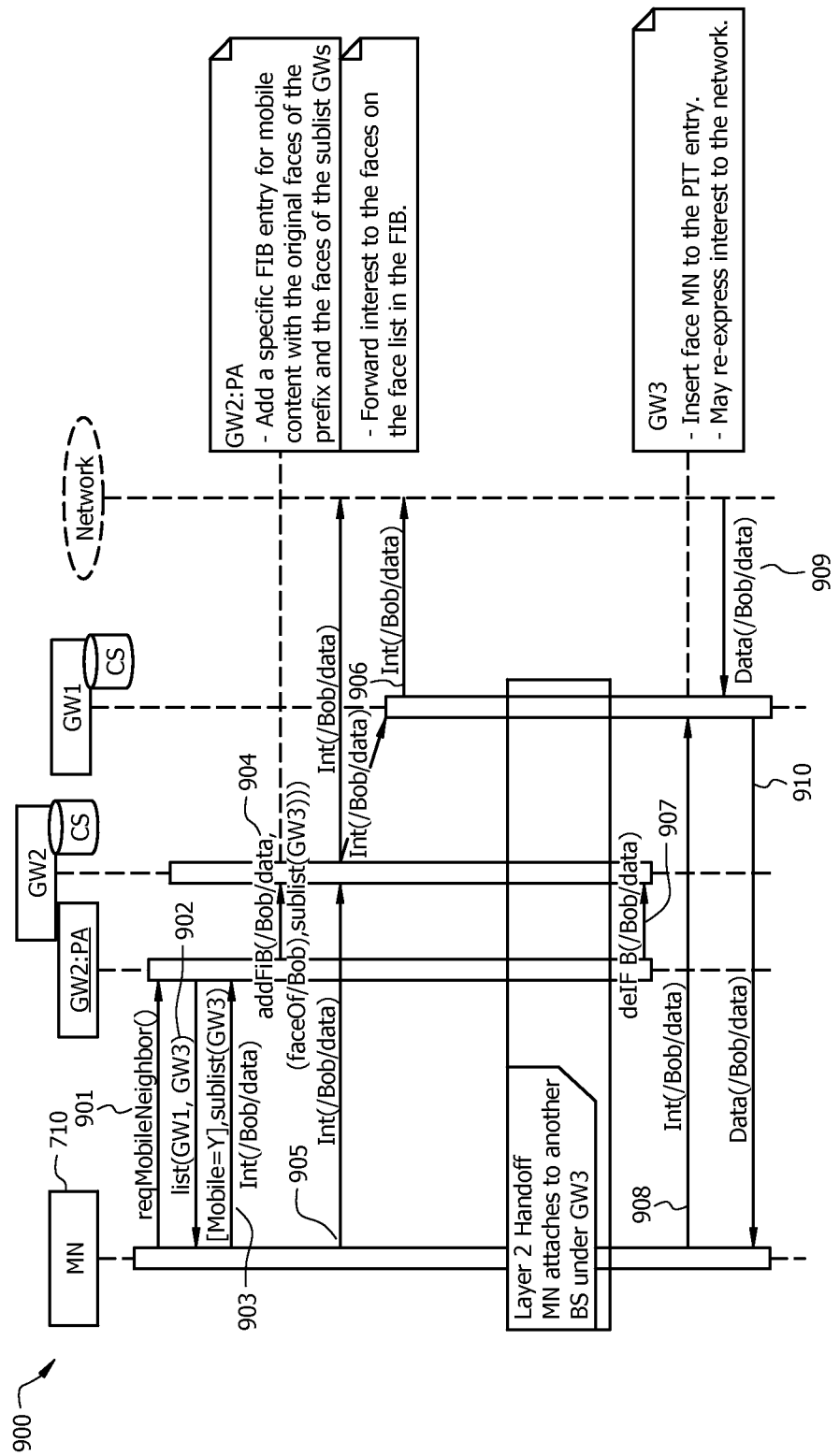
FIG. 9 is a protocol diagram of another embodiment of a seamless mobility method.

FIG. 9 illustrates another embodiment of a seamless mobility method 900 that may be implemented in the seamless mobility scheme 700. The method 900 comprises the message exchanges when the content is returned to GW1 after the handoff procedure of MN 710 (from GW2 to GW1) is completed, i.e., after the MN's 710 move to GW1 is completed. The operations of the MNs and the gateways in the method 900 may be implemented by MAs (at the MNs) and PAs (at the gateways). At step 901, when the MN 710 attaches to GW2, the MN 710 may send a request to GW2 to obtain the neighbor gateways of GW2. At step 902, the PA of GW2 may return a list of the neighbor gateways. At step 903, the MN 710 may send (in a message) an interest for content with a specific prefix that indicates the content source or provider and the name of content/data. The message may also indicate that seamless mobility support is enabled and a subset from the neighbor gateways to which the MN 710 may move to. The subset of neighbor gateways may represent the potential gateways that the MN 710 is expected to move to from the current gateway. At step 904, the PA of GW2 may add a FIB entry including the specific prefix from the MN 710, an associated face for the next-hop to the source, and the indicated subset of neighbor gateways.

At step 905, the MN 710 may send an interest for the content to GW2, which may be forwarded in turn from GW2 to the network via the faces associated with the prefix (indicated in the interest) in the FIB. Thus, the interest may reach the neighbor gateway, GW1, indicated in the faces of the FIB entry. At step 906, GW1 may also forward the interest to the network. Subsequently, the MN 710 may complete a handoff procedure and attach to a new BS under GW1. At step 907, the PA of GW2 may delete the FIB entry for the MN 710. At step 908, the MN 710 may send an interest for the content to GW1. GW1 may then insert in its PIT a face for the MN 710, and re-express the interest to the network. The interest may eventually reach the source (Bob), which may respond with the content/data. At step 909, the network may return the content/data to BS3. At step 910, GW1 may return the content/data to the MN 710.

Figure 10A:
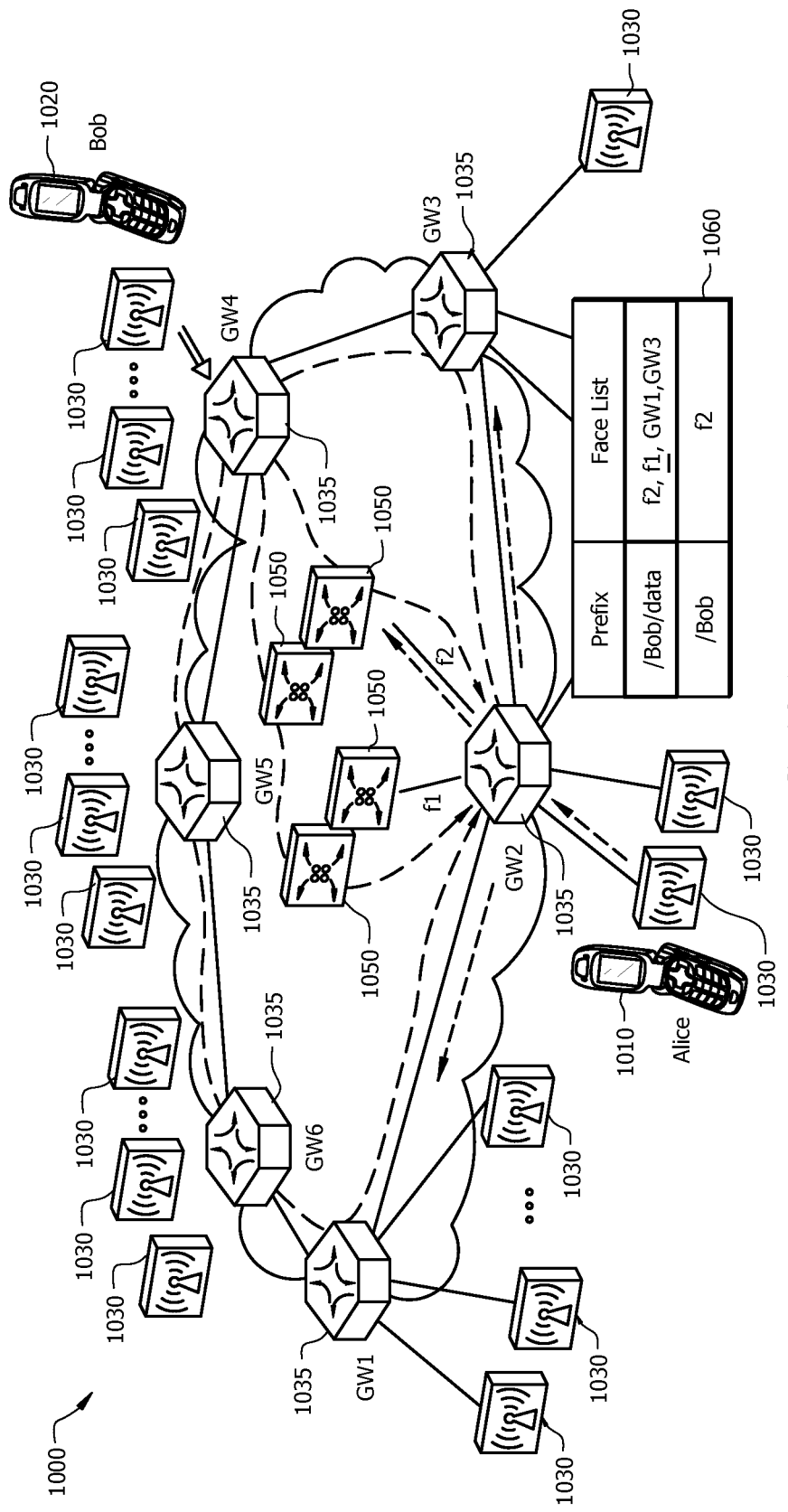
FIGS. 10A and 10B are schematic diagrams for another seamless mobility scheme according to an embodiment of the disclosure.
Figure 10B:
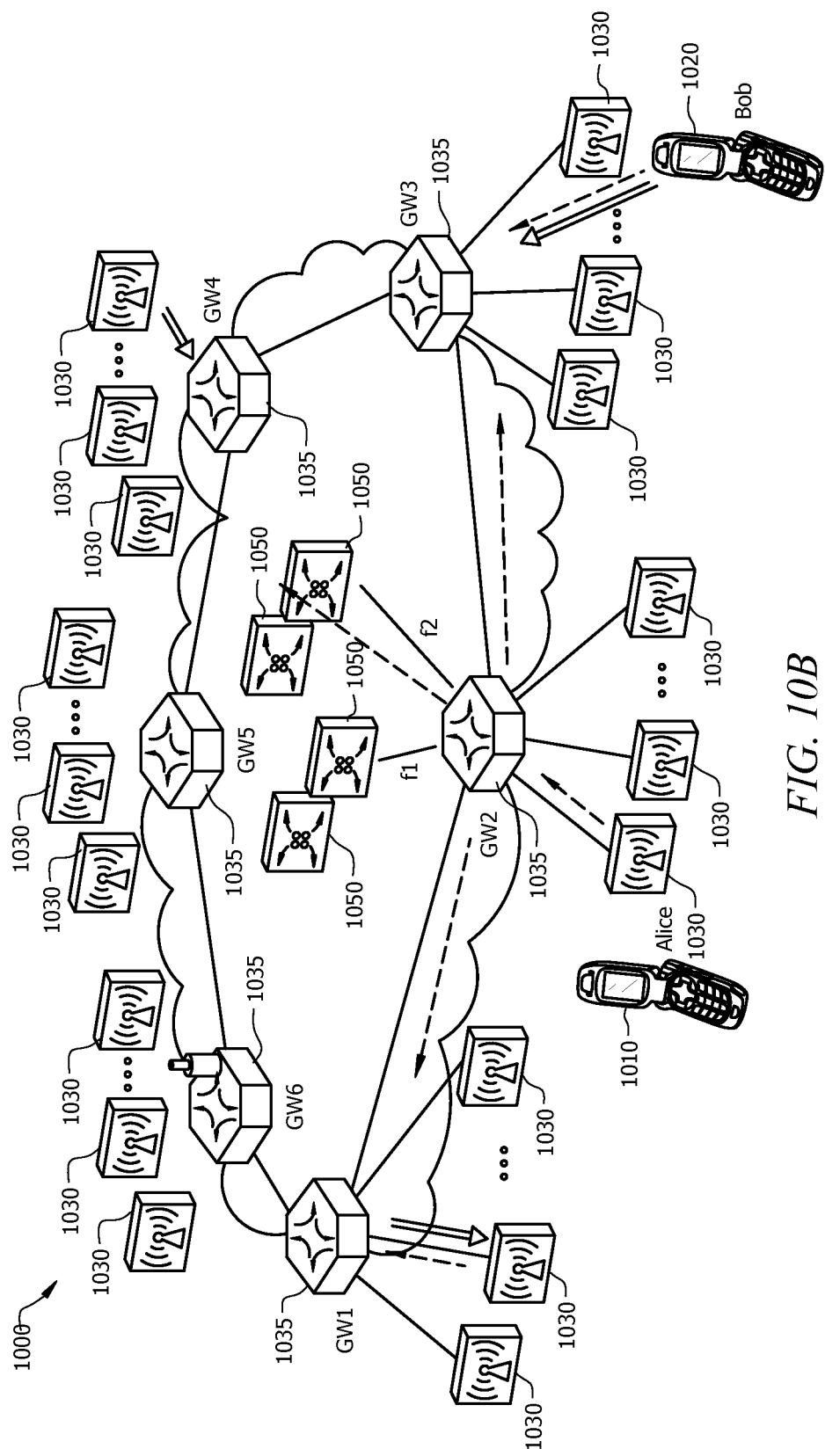

FIGS. 10A and 10B illustrate an embodiment of another seamless mobility scheme 1000 for a mobile content publisher in a CCN/NDN. The CCN/NDN may comprise a MN 1010, a second MN 1020, a plurality of BSs 1030 under a plurality of corresponding gateways 1035, and a plurality of content routers 1050. The CCN/NDN may comprise any number of such components. The components may be configured similar to the corresponding components in the scheme 800.

In FIG. 10A, a second MN 1020 for a content publisher (Bob) may attach to a first BS 1030 under a first gateway 1035, GW4. GW4 may have a list of neighbor gateways 1035, GW3 and GW5. The second MN 1020 may send an announcement for a mobile content to GW4. GW4 may then forward the announcement to its neighbor gateways 1035 and the network. The neighbor gateways 1035 may also forward the announcements to the network. The gateway 1035, GW2, attached (via a BS 1030) to a content requester, the MN 1010, may receive the announcement from one or more faces (next-hops) and add the faces to its FIB 1060. When the requester MN 1010 (for a user, Alice) sends out an interest for the content of Bob to GW2, GW2 may in turn forward the interest to all the faces in its FIB that may be associated with the prefix in the interest. The faces (next-hops) may in turn forward the interest to the potential gateways 1035 to which the second MN 1020 may move to.

For instance, the second MN 1020 may move from the BS 1030 under GW4 to a new BS 1030 under GW3. In FIG. 10B, the second MN 1020 may receive the interest before moving to GW3. In this case, after the move is completed, the second MN 1020 may publish the content to GW3. Since a PIT entry may have been already created at GW3 for the content, the second MN 1020 may forward the data (via the network and GW2) to the MN 1010. Alternatively, the second MN 1020 may move to GW3 before receiving the interest. In this case, after the move is completed, the second MN 1020 may publish the content to GW3. GW3 may then re-express the interest received from the MN 1010 to the second MN 1020. The second MN 1020 may then send back the data. Specifically, when GW3 receives the interest from the MN 1010 before the second MN 1020 publishes the content to GW3, GW3 may not find a FIB entry to route the interest for the second MN 1020. Thus, GW3 may hold the interest and subsequently re-express the interest to the second MN 1020 when an entry for the second MN 1020 is created in its FIB. For instance, GW3 may hold the interest instead of dropping the interest if GW3 has some indication that the second MN 1020 is moving into GW3's coverage area.

Figure 11:
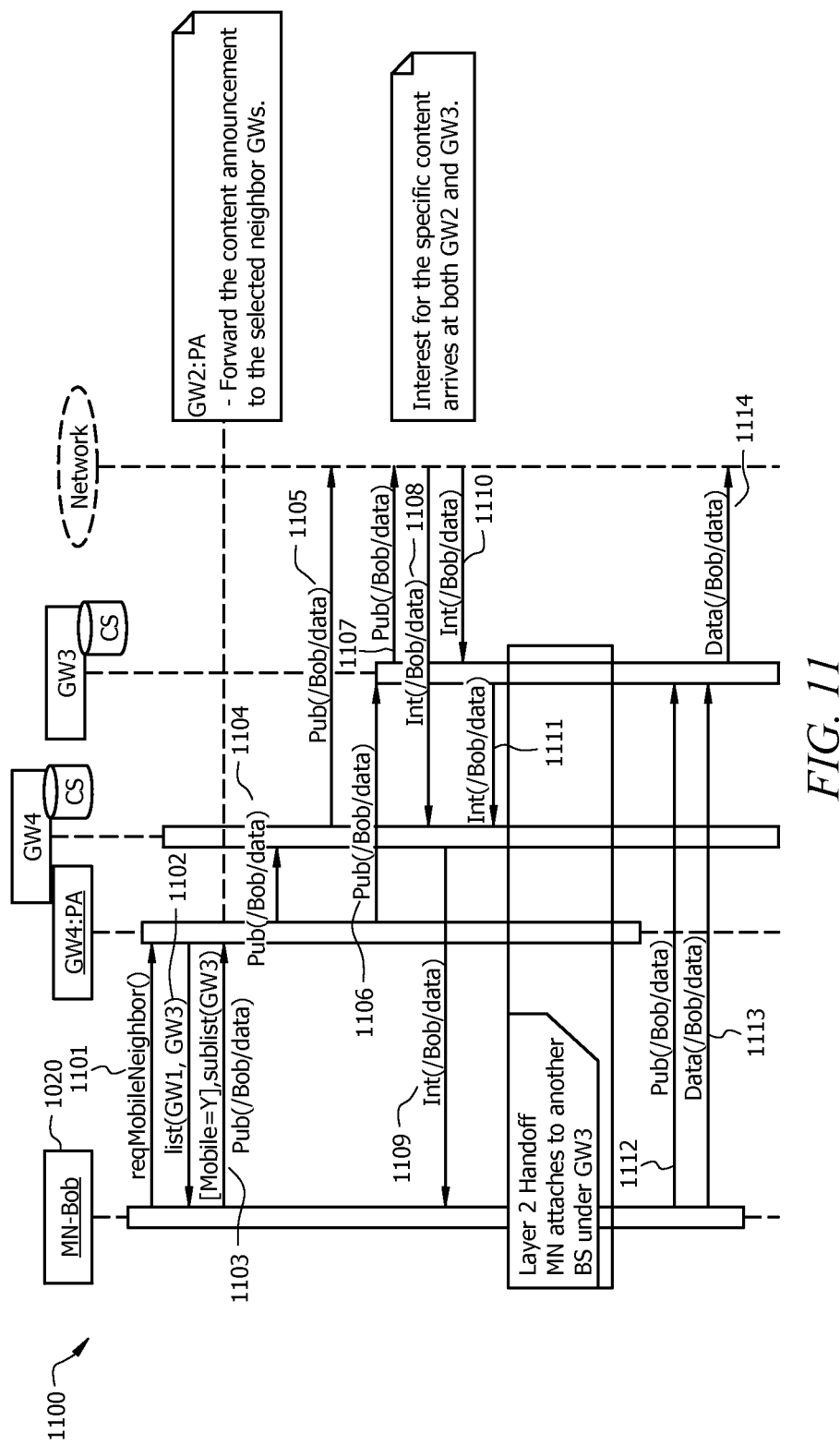
FIG. 11 is a protocol diagram of another embodiment of a seamless mobility method.

FIG. 11 illustrates an embodiment of a seamless mobility method 1100 that may be implemented in the seamless mobility scheme 1000. The method 1100 comprises the message exchanges in the case when the second MN 1020 receives the interest for content before the second MN 1020 completes the move from GW4 to GW3. The operations of the MNs and the gateways in the method 1100 may be implemented by MAs (at the MNs) and PAs (at the gateways). At step 1101, when the second MN 1020 attaches to a BS under GW4, the second MN 1020 may send a request to GW4 to obtain the neighbor gateways of GW4. At step 1102, the PA of GW4 may return a list of the neighbor gateways. At step 1103, the second MN 1020 may publish (in a message) content with a specific prefix that indicates the content source or provider and the name of content/data to the PA of GW4. The message may also indicate that seamless mobility support is enabled and a subset from the neighbor gateways to which the second MN 1020 may move to. The subset of neighbor gateways may represent the potential gateways that the second MN 1020 is expected to move to from the current gateway. The PA of GW4 may in turn publish the content indicated by the second MN 1020 to the subset of neighbor gateways. At step 1104, the PA of GW4 may publish the content to GW4. At step 1105, GW4 may publish the content to the network. At step 1106, the PA of GW4 may publish the content to the neighbor gateways, GW3. At step 1107, GW3 may in turn further publish the content to the network.

At step 1108, the network may send an interest for the content (from the MN 1010) to GW4. At step 1109, GW4 may in turn send the interest to the second MN 1020. At step 1110, the network may also send the interest to GW3. As such, the interest may arrive to both GW3 and GW4. At step 1111, GW3 may in turn send the interest to GW4. Subsequently, the second MN 1020 may complete a handoff procedure and attach to a new BS under GW3. At step 1112, the second MN 1020 may publish the content to GW3. At step 1113, the second MN 1020 may send the requested content data to GW3. At step 1114, GW3 may in turn send the data to the network, which may then forward the data to the requesting MN 1010.

Figure 12:
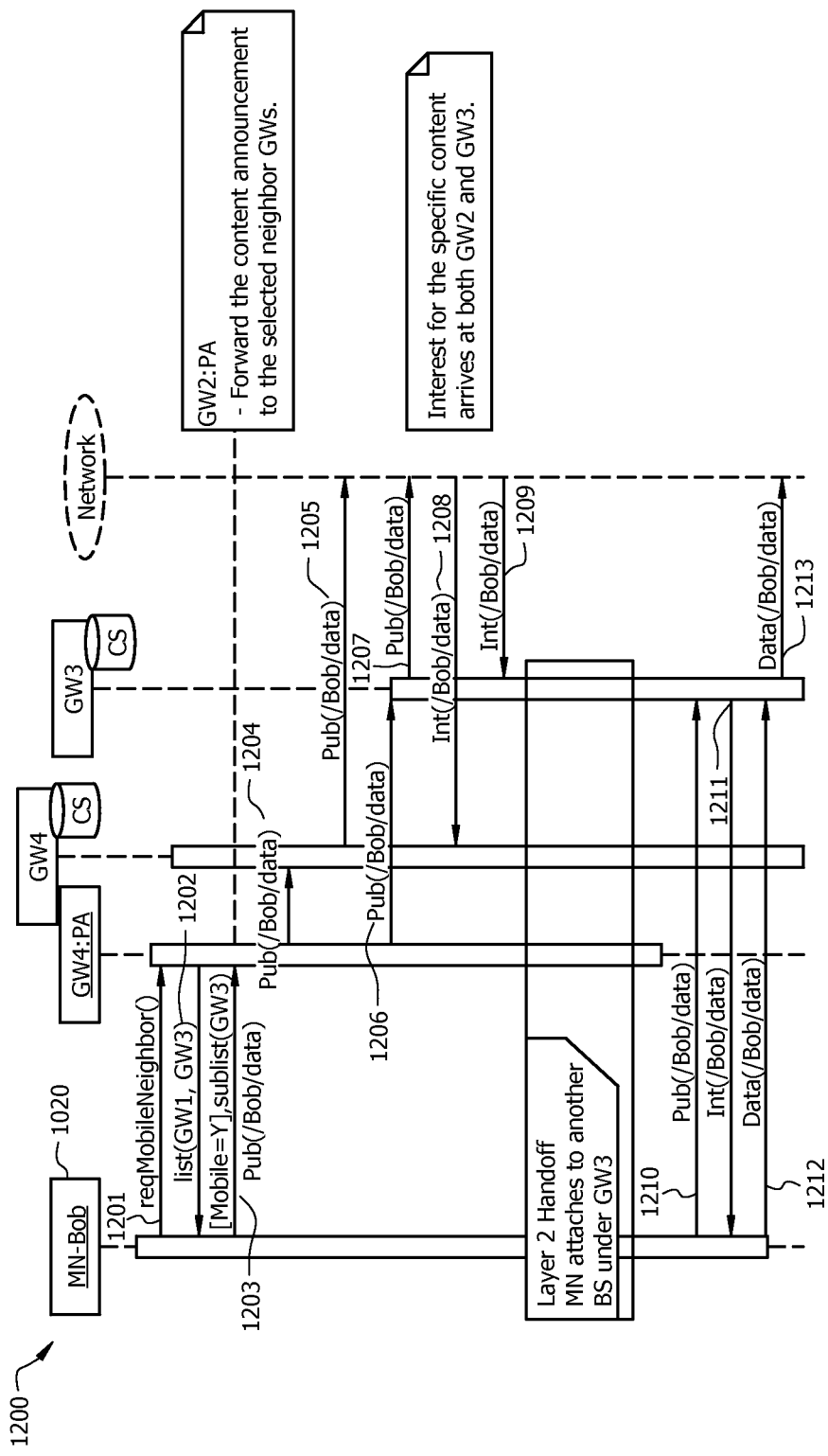
FIG. 12 is a protocol diagram of another embodiment of a seamless mobility method.

FIG. 12 illustrates an embodiment of a seamless mobility method 1200 that may be implemented in the seamless mobility scheme 1000. The method 1200 comprises the message exchanges in the case when the second MN 1020 receives the interest for content after the second MN 1020 moves to GW3. The operations of the MNs and the gateways in the method 1200 may be implemented by MAs (at the MNs) and PAs (at the gateways). At step 1201, when the second MN 1020 attaches to GW4, the second MN 1020 may send a request to GW4 to obtain the neighbor gateways of GW4. At step 1202, the PA of GW4 may return a list of the neighbor gateways. At step 1203, the second MN 1020 may publish (in a message) content with a specific prefix that indicates the content source or provider and the name of content/data to the PA of GW4. The message may also indicate that seamless mobility support is enabled and a subset from the neighbor gateways to which the second MN 1020 may move to. The subset of neighbor gateways may represent the potential gateways that the second MN 1020 is expected to move to from the current gateway. The PA of GW4 may in turn publish the content indicated by the second MN 1020 to the subset of neighbor gateways. At step 1204, the PA may publish the content to GW4. At step 1205, GW4 may publish the content to the network. At step 1206, the PA of GW4 may publish the content to the neighbor gateway, GW3. At step 1207, GW3 may in turn further publish the content to the network.

At step 1208, the network may send an interest for the content (from the MN 1010) to GW4. At step 1209, the network may also send the interest to GW3. As such, the interest may arrive to both GW3 and GW4. Subsequently, the second MN 1020 may complete a handoff procedure and attach to a new BS under GW3. At step 1210, the second MN 1020 may publish the content to GW3. At step 1211, GW3 may send the received interest to the second MN 1020. At step 1212, the second MN 1020 may send the requested content data to GW3. At step 1213, GW3 may in turn send the data to the network, which may then forward the data to the requesting MN 1010.

Figure 13:
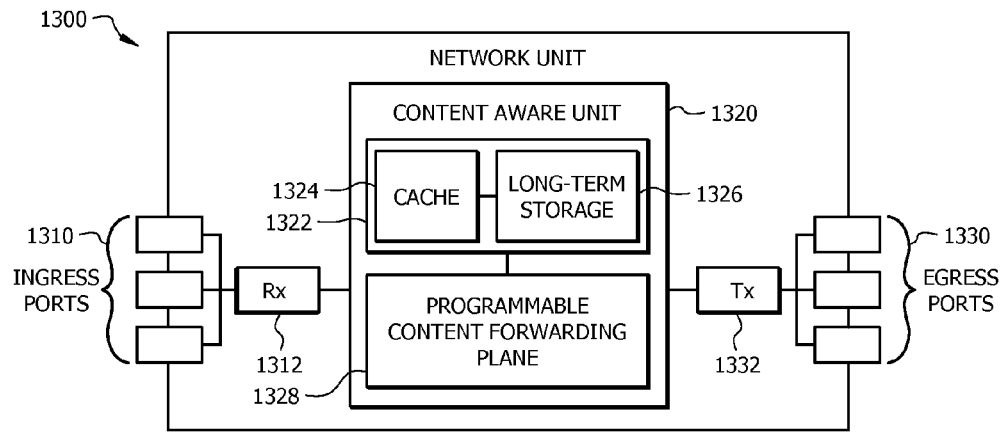
FIG. 13 is a schematic diagram of an embodiment of a network unit.

FIG. 13 illustrates an embodiment of a network unit 1300, which may be any device that transports and processes data through a network. For instance, the network unit 1300 may correspond to or may be located in any of the system nodes described above, such as a MN, BS, gateway, or content router. The network unit 1300 may also be configured to implement or support the schemes and methods described above. The network unit 1300 may comprise one or more ingress ports or units 1310 coupled to a receiver (Rx) 1312 for receiving signals and frames/data from other network components. The network unit 1300 may comprise a content aware unit 1320 to determine which network components to send content to. The content aware unit 1320 may be implemented using hardware, software, or both. The network unit 1300 may also comprise one or more egress ports or units 1330 coupled to a transmitter (Tx) 1332 for transmitting signals and frames/data to the other network components. The receiver 1312, content aware unit 1320, and transmitter 1332 may also be configured to implement at least some of the disclosed schemes and methods above, which may be based on hardware, software, or both. The components of the network unit 1300 may be arranged as shown in FIG. 13.

The content aware unit 1320 may also comprise a programmable content forwarding plane block 1328 and one or more storage blocks 1322 that may be coupled to the programmable content forwarding plane block 1328. The programmable content forwarding plane block 1328 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1320 or the network unit 1300. The programmable content forwarding plane block 1328 may interpret user requests for content and accordingly fetch content, e.g., based on meta-data and/or content name (prefix), from the network or other content routers and may store the content, e.g., temporarily, in the storage blocks 1322. The programmable content forwarding plane block 1328 may then forward the cached content to the user. The programmable content forwarding plane block 1328 may be implemented using software, hardware, or both and may operate above the IP layer or L2.

The storage blocks 1322 may comprise a cache 1324 for temporarily storing content, such as content that is requested by a subscriber. Additionally, the storage blocks 1322 may comprise a long-term storage 1326 for storing content relatively longer, such as content submitted by a publisher. For instance, the cache 1324 and the long-term storage 1326 may include Dynamic random-access memories (DRAMs), solid-state drives (SSDs), hard disks, or combinations thereof.

Figure 14:
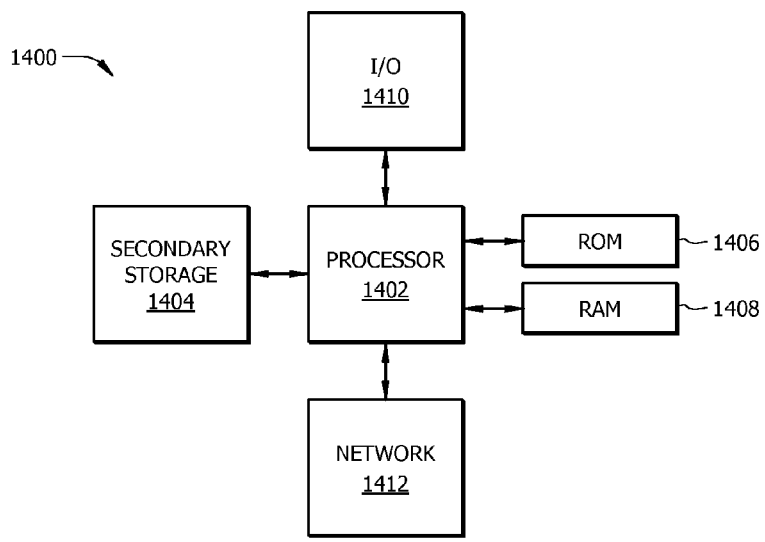
FIG. 14 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 14 illustrates a typical, general-purpose network component 1400 suitable for implementing one or more embodiments of the components disclosed herein. The network component 1400 includes a processor 1402 (which may be referred to as a central processor unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, or may be part of one or more application specific integrated circuits (ASICs).

The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 1404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content-centric-network (CCN) or named-data networking (NDN) system to support seamless mobility for a mobile node (MN) comprising:
a first point of attachment (PoA) configured to indicate to the MN that attaches to the first PoA one or more neighbor PoAs and to multicast an interest for content from the MN to the neighbor PoAs in a CCN or NDN when the MN starts a handoff procedure; and
a second PoA from the one or more neighbor PoAs of the first PoA configured to receive the multicast interest from the first PoA, forward the interest to the CCN or NDN, receive content data from the CCN or NDN, and forward the content data to the MN.

2. The networking system of claim 1, wherein the second PoA is configured to cache content data in a content store (CS) if the content data is received before the MN completes the handoff procedure and attaches to the second PoA.

3. The networking system of claim 2, wherein the cached content data is forwarded to the MN after the second PoA receives an interest from the MN.

4. The networking system of claim 1, wherein the second PoA is configured to insert a face for the MN in a pending interest table (PIT) after receiving an interest from the MN if the MN completes the handoff procedure and attaches to the second PoA before the content data is received.

5. The networking system of claim 4, wherein the content data is forwarded to the MN after receiving an interest from the MN and after the second PoA receives the content data.

6. The networking system of claim 1, wherein the first PoA is configured to indicate the neighbor PoAs to the MN after receiving a request about the neighbor PoAs from the MN.

7. The networking system of claim 1, wherein the first PoA receives the interest from the MN with an indication that seamless mobility for the MN is enabled and a list of potential neighbor PoAs to which the MN is expected to move from the neighbor PoAs of the first PoA.

8. The networking system of claim 1, wherein the received interest for content from the MN indicates a set of specific prefixes for the content that includes a name for the content's providers and a set of names for the content.

9. The networking system of claim 8, wherein the first PoA is configured to associate at least one specific prefix of the set of specific prefixes with a face list in an entry in a forward information base (FIB), and wherein the face list indicates one or more next-hops and the neighbor PoAs of the first PoA.

10. The networking system of claim 9, wherein the first PoA is configured to delete the entry in the FIB after the MN completes the handoff procedure and attaches to the second PoA.

11. The networking system of claim 1, wherein the first PoA is a first base station (BS) coupled to the CCN or NDN, and wherein the second PoA is a second BS coupled to the CCN or NDN and is a neighbor BS for the first BS.

12. The networking system of claim 1, wherein the first PoA is a first gateway at the edge of the CCN or NDN and coupled to one or more base stations (BSs) that are configured to attach to the MN, and wherein the second PoA is a second gateway at the edge of the CCN or NDN that is a neighbor gateway for the first gateway and coupled to one or more additional BSs that are configured to attach to the MN.

13. A content-centric-network (CCN) or named-data networking (NDN) system to support seamless mobility for a mobile node (MN) comprising:
a first point of attachment (PoA) configured to indicate to the MN that attaches to the first PoA one or more neighbor PoAs and to multicast an announcement for content from the MN to the neighbor PoAs in a CCN or NDN to support seamless mobility for the MN when the MN starts a handoff procedure; and
a second PoA from the one or more neighbor PoAs of the first PoA configured to receive the multicast announcement from the first PoA, forward the announcement to the CCN or NDN, receive interest for content from the CCN or NDN, and forward the interest to the MN.

14. The networking system of claim 13, wherein the second PoA is configured to forward content data from the MN to the CCN or NDN after receiving an announcement for content from the MN if the interest is sent to the MN via the first PoA before the MN attaches to the second PoA.

15. The networking system of claim 14, wherein the second PoA receives the announcement for content from the MN after the MN completes the handoff procedure and attaches to the second PoA.

16. The networking system of claim 13, wherein the second PoA is configured to forward content data from the MN to the CCN or NDN after sending the interest directly to the MN if the MN completes the handoff procedure and attaches to the second PoA before receiving the interest.

17. The networking system of claim 16, wherein the second PoA sends the interest directly to the MN after receiving an announcement for content from the MN.

18. The networking system of claim 13, wherein the first PoA is configured to indicate the neighbor PoAs to the MN after receiving a request about the neighbor PoAs from the MN.

19. The networking system of claim 13, wherein the received announcement for content from the MN indicates a specific prefix for the content that includes a name for the content's provider and a name for the content.

20. The networking system of claim 13, wherein the first PoA receives the announcement from the MN with an indication that seamless mobility for the MN is enabled and a list of potential neighbor PoAs to which the MN is expected to move from the neighbor PoAs of the first PoA.

21. The networking system of claim 13, wherein the first PoA is a first base station (BS) coupled to the CCN or NDN, and wherein the second PoA is a second BS coupled to the CCN or NDN and is a neighbor BS for the first BS.

22. The networking system of claim 13, wherein the first PoA is a first gateway at the edge of the CCN or NDN and coupled to one or more base stations (BSs) that are configured to attach to the MN, and wherein the second PoA is a second gateway at the edge of the CCN or NDN that is a neighbor gateway for the first gateway and coupled to one or more additional BSs that are configured to attach to the MN.

23. A network component that supports seamless mobility for a mobile node (MN) for a content-centric-network (CCN) or named-data networking (NDN) comprising:
a transmitter; and
a processor coupled to the transmitter configured to:
implement a proxy agent (PA);
employ the transmitter to communicate with a mobility agent (MA) at the MN that is anchored to the network component to indicate to the MN information about one or more neighbor peers;
employ the transmitter to multicast an interest from the MN to the neighbor peers and a CCN or NDN when the MN is a content requester; and
employ the transmitter to multicast an announcement from the MN to the neighbor peers and the CCN or NDN when the MN is a content publisher.

24. The network component of claim 23, wherein multicasting the interest to the neighbor peers allows the peers to receive and cache content data for the interest at a content store (CS) or to add a face for the MN at a pending interest table (PIT) before the MN completes a handover procedure from the network component to attach to one of the neighbor peers.

25. The network component of claim 23, wherein multicasting the announcement to the neighbor peers enables building multiple paths where content is potentially reachable when the MN moves to one of the neighbor peers.

26. The network component of claim 23, wherein the PA and the MA communicate at an NDN protocol layer.

27. A network component that supports seamless mobility for a mobile node (MN) for a content-centric-network (CCN) or named-data networking (NDN) comprising:
a receiver configured to receive from a neighbor peer an interest or announcement for content that was sent from the MN attached to the neighbor peer before the MN moves to the network component; and
a transmitter configured to send the interest or announcement to a CCN or NDN before the MN attaches to the network component.

28. The network component of claim 27, wherein the receiver is further configured to receive content data or an interest for content from the CCN or NDN after the interest or announcement is sent to the CCN or NDN by the transmitter, and wherein the transmitter is further configured to transmit the received content data or the interest for content to the MN after the MN attaches to the network component.

29. The network component of claim 27, wherein the neighbor peer is a base station coupled directly to the MN, an edge gateway coupled via a base station to the MN, or another type of point of attachment that anchors the MN to the CCN or NDN.

30. A method implemented by a network component of a content-centric-network (CCN) or named-data networking (NDN) for providing seamless mobility to a mobile node (MN), comprising:
receiving, using a receiver, from the MN attached to the network component a request about a plurality of neighbor peers for the network component;
receiving an indication to enable seamless mobility for the MN;
receiving an interest or announcement for content from the MN;
receiving one or more selected neighbor peers from the MN; and
multicasting, using a transmitter, the interest or announcement to a CCN or NDN and the selected neighbor peers before the MN moves and attaches to one of the selected neighbor peers.

31. The method of claim 30 further comprising:
receiving a specific prefix for the content that includes a name for the content's provider and a name for the content; and
adding in a forward information base (FIB) an entry that associates the specific prefix with a face list that indicates one or more next-hops and the neighbor peers; and
deleting the entry after the MN moves and attaches to one of the selected neighbor peers.

32. The method of claim 30 further comprising:
receiving from one of the neighbor peers an interest for content that is forwarded from the CCN or NDN; and
forwarding the interest for content from the one of the neighbor peers to the MN before the MN attaches to the one of the selected neighbor peers.

33. A method implemented by a network component of a content-centric-network (CCN) or named-data networking (NDN) for providing seamless mobility to a mobile node (MN), comprising:
receiving, using a receiver, an interest or announcement for content that is sent from the MN via a neighbor peer attached to the MN;
forwarding the interest or announcement to a CCN or NDN before the MN moves from the neighbor peer and attaches to the network component;
receiving content data or an interest for content from the CCN or NDN after forwarding the interest or announcement to the CCN or NDN; and
forwarding the content data or the interest for content from the CCN or NDN to the MN.

34. The method of claim 33 further comprising:
caching the content data if the content data is received before the MN attaches to the network component; and
forwarding the cached content data to the MN upon receiving a re-expressed interest for the content data from the MN after the MN attaches to the network component.

35. The method of claim 33 further comprising:
receiving a re-expressed interest for content from the MN after the MN attaches to the network component; and
inserting a face for the MN in a pending entry table (PIT) entry before receiving and forwarding the content data from the CCN or NDN to the MN.

36. The method of claim 33 further comprising:
forwarding the interest for content from the CCN or NDN to the MN via the neighbor peer before the MN moves from the neighbor peer; and
receiving a re-expressed announcement for content from the MN after the MN attaches to the network component before receiving and forwarding the content data to the MN.

37. The method of claim 33 further comprising:
receiving a re-expressed announcement for content from the MN after the MN attaches to the network component from the neighbor peer; and
forwarding the interest for content from the CCN or NDN to the MN before receiving and forwarding the content data to the MN.

38. A non-transitory computer readable medium embodied with computer executable instructions for use by a network component of a content-centric-network (CCN) or named-data networking (NDN) for providing seamless mobility to a mobile node (MN), wherein the computer executable instructions, when executed by a processor, cause the network component to:
- receive, using a receiver, from the MN attached to the network component a request about a plurality of neighbor peers for the network component;
- receive an indication to enable seamless mobility for the MN;
- receive an interest or announcement for content from the MN;
- receive one or more selected neighbor peers from the MN; and
- multicast, using a transmitter, the interest or announcement to a CCN or NDN and the selected neighbor peers before the MN moves and attaches to one of the selected neighbor peers.

39. The non-transitory computer readable medium of claim 38, wherein the instructions further cause the network component to:
- receive a specific prefix for the content that includes a name for the content's provider and a name for the content; and
- add in a forward information base (FIB) an entry that associates the specific prefix with a face list that indicates one or more next-hops and the neighbor peers; and
- delete the entry after the MN moves and attaches to one of the selected neighbor peers.

40. The non-transitory computer readable medium of claim 38, wherein the instructions further cause the network component to:
- receive from one of the neighbor peers an interest for content that is forwarded from the CCN or NDN; and
- forward the interest for content from the one of the neighbor peers to the MN before the MN attaches to the one of the selected neighbor peers.

41. A non-transitory computer readable medium embodied with computer executable instructions for use by a network component of a content-centric-network (CCN) or named-data networking (NDN) for providing seamless mobility to a mobile node (MN), wherein the computer executable instructions, when executed by a processor, cause the network component to:
- receive, using a receiver, an interest or announcement for content that is sent from the MN via a neighbor peer attached to the MN;
- forward the interest or announcement to a CCN or NDN before the MN moves from the neighbor peer and attaches to the network component;
- receive content data or an interest for content from the CCN or NDN after forwarding the interest or announcement to the CCN or NDN; and
- forward the content data or the interest for content from the CCN or NDN to the MN.

42. The non-transitory computer readable medium of claim 41, wherein the instructions further cause the network component to:
- cache the content data if the content data is received before the MN attaches to the network component; and
- forward the cached content data to the MN upon receiving a re-expressed interest for the content data from the MN after the MN attaches to the network component.

43. The non-transitory computer readable medium of claim 41, wherein the instructions further cause the network component to:
- receive a re-expressed interest for content from the MN after the MN attaches to the network component; and
- insert a face for the MN in a pending entry table (PIT) entry before receiving and forwarding the content data from the CCN or NDN to the MN.

* * * * *